(12) United States Patent
Chenderovitch

(10) Patent No.: US 12,554,115 B2
(45) Date of Patent: Feb. 17, 2026

(54) HELMET MOUNT

(71) Applicant: General Starlight Co. Inc., Woodbridge (CA)

(72) Inventor: Simon Chenderovitch, Maple (CA)

(73) Assignee: General Starlight Co. Inc., Woodbridge, CA (US)

( * ) Notice: Subject to any disclaimer, the term of this patent is extended or adjusted under 35 U.S.C. 154(b) by 0 days.

(21) Appl. No.: 18/962,650

(22) Filed: Nov. 27, 2024

(65) Prior Publication Data

US 2025/0180886 A1 Jun. 5, 2025

Related U.S. Application Data

(60) Provisional application No. 63/605,313, filed on Dec. 1, 2023.

(51) Int. Cl.
*A42B 3/04* (2006.01)
*G02B 23/12* (2006.01)
*G02B 23/18* (2006.01)
*G02B 23/16* (2006.01)

(52) U.S. Cl.
CPC ............ *G02B 23/125* (2013.01); *G02B 23/18* (2013.01)

(58) Field of Classification Search
CPC .............................. G02B 23/125; G02B 23/18
See application file for complete search history.

(56) References Cited

U.S. PATENT DOCUMENTS

| | | | | |
|---|---|---|---|---|
| 3,608,997 A | * | 9/1971 | Humphrey ............ | G02B 27/646 |
| | | | | 359/557 |
| 3,817,594 A | * | 6/1974 | Fischer .................... | G02B 7/12 |
| | | | | 359/415 |
| 12,253,665 B2 | * | 3/2025 | Friedman ................ | F16M 11/10 |
| 12,253,671 B2 | * | 3/2025 | Chenderovitch .. | G02B 27/0101 |
| 2011/0145981 A1 | * | 6/2011 | Teetzel .................. | G02B 23/125 |
| | | | | 2/422 |
| 2014/0084120 A1 | * | 3/2014 | Solinsky ................ | A42B 3/042 |
| | | | | 248/227.1 |

(Continued)

FOREIGN PATENT DOCUMENTS

WO 2023/049844 A2 3/2023

OTHER PUBLICATIONS

International Search Report and Written Opinion received for PCT Application No. PCT/US2024/057842, mailed on Feb. 18, 2025, 16 pages.

*Primary Examiner* — Robert H Muromoto, Jr.
(74) *Attorney, Agent, or Firm* — Spencer Fane, LLP

(57) ABSTRACT

Versatile helmet mount assemblies and subassemblies are disclosed herein. In an embodiment, a helmet mount assembly includes a device mount, a helmet mount and a pivot structure. The device mount is configured to removably attach to a plurality of optical devices. The helmet mount is configured to removably attach to a plurality of helmets. The pivot structure includes a first pivot adjustment mechanism and a second pivot adjustment mechanism. The first pivot adjustment mechanism enables the device mount part to pivot a first rotational distance with respect to the helmet mount part between a deployed position and a stowed position. The second pivot adjustment mechanism second pivot adjustment mechanism enables the device mount part to pivot a second rotational distance with respect to the helmet mount part from the operative position.

20 Claims, 19 Drawing Sheets

(56) References Cited

U.S. PATENT DOCUMENTS

2020/0400934 A1* 12/2020 Appel .................. G02B 23/125
2021/0244120 A1*  8/2021 Meney .................. F16M 13/04
2024/0027758 A1*  1/2024 Chenderovitch ...... G02B 23/16
2024/0402480 A1* 12/2024 Friedman ................ A42B 3/04

* cited by examiner

HELMET MOUNT

PRIORITY CLAIM

The present application claims priority to U.S. Provisional Patent Application No. 63/605,313, filed Dec. 1, 2023 and entitled "Helmet Mount," the entire contents of which is incorporated herein by reference.

BACKGROUND

Technical Field

The present disclosure generally relates to helmet mount assembly. More specifically, the present disclosure relates to an adjustable helmet mount assembly that attaches an optical device to a helmet and then enables the optical device positioning to be adjusted to fit the user's face.

BACKGROUND INFORMATION

Helmet mounts enable hands-free operation of optical devices, such as night vision goggles in low-light environment. These types of mounts are typically used by security, military and law enforcement personnel in situations requiring optimal positioning, durability and shock resistance, among other factors.

SUMMARY

The present disclosure provides a helmet mount assembly for use with optical-electronic devices such as night vision goggles, with multiple degrees of freedom enabling users to achieve the optimal viewing angles for their specific needs. The helmet mount assembly has a sleek and low-profile aesthetic that minimizes obtrusiveness, maximizes functionality, and is particularly advantageous for military and law enforcement personnel who require a lightweight, strong, and highly adjustable mount to support critical missions. The helmet mount assembly is easy to install and detach, enabling quick and efficient setup and removal when necessary. The helmet mount is ideal for monocular devices and binocular devices, but can be used for any suitable device.

In view of the state of the known technology, one aspect of the present disclosure is to provide a helmet mount assembly configured to moveably attach a plurality of optical devices to a plurality of helmets. The helmet mount assembly includes a device mount, a helmet mount and a pivot structure. The device mount is configured to removably attach to the plurality of optical devices. The helmet mount is configured to removably attach to the plurality of helmets. The pivot structure includes a device mount part, a helmet mount part, a first pivot adjustment mechanism and a second pivot adjustment mechanism. The device mount is moveably connected to the device mount part so as to linearly translate with respect to the device mount part. The helmet mount is moveably connected to the helmet mount part so as to linearly translate with respect to the helmet mount part. The first pivot adjustment mechanism enables the device mount part to pivot a first rotational distance with respect to the helmet mount part between a deployed position and a stowed position. The second pivot adjustment mechanism enables the device mount part to pivot a second rotational distance with respect to the helmet mount part from the deployed position, with the second rotational distance being smaller than the first rotational distance.

Another aspect of the present disclosure is to provide another helmet mount assembly configured to moveably attach a plurality of optical devices to a plurality of helmets. The helmet mount assembly includes a device mount, a helmet mount and a pivot structure. The device mount is configured to removably attach to the plurality of optical devices. The helmet mount is configured to removably attach to the plurality of helmets. The pivot structure includes a device mount part, a helmet mount part, a first pivot subassembly, a second pivot subassembly and a third pivot subassembly. The device mount is moveably connected to the device mount part so as to linearly translate with respect to the device mount part. The helmet mount is moveably connected to the helmet mount part so as to linearly translate with respect to the helmet mount part. The first pivot subassembly and the third pivot subassembly are operably attached and cooperate to enable the device mount part to pivot a first rotational distance with respect to the helmet mount part between a deployed position and a stowed position. The second pivot subassembly and the third pivot subassembly are operably attached and cooperate to enable the device mount part to pivot a second rotational distance with respect to the helmet mount part from the deployed position, with the second rotational distance being smaller than the first rotational distance.

Another aspect of the present disclosure is to provide another helmet mount assembly configured to moveably attach a plurality of optical devices to a plurality of helmets. The helmet mount assembly includes a device mount, a helmet mount and a pivot structure. The device mount is configured to removably attach to the plurality of optical devices. The helmet mount is configured to removably attach to the plurality of helmets. The pivot structure pivotally connects the device mount to the helmet mount. The device mount includes a housing and a release lever. The release lever is pivotally connected to the housing at a pivot point and has a locking tooth. The release lever is actuated to cause the locking tooth to move from a locked position in which the locking tooth engages an optical device to a retracted position in which the locking tooth releases the optical device. The pivot point of the release lever is adjustable with respect to the housing to alter a relative positioning of the locking tooth when in the locked position.

Other objects, features, aspects and advantages of the systems and methods disclosed herein will become apparent to those skilled in the art from the following detailed description, which, taken in conjunction with the annexed drawings, discloses exemplary embodiments of the disclosed systems and methods.

BRIEF DESCRIPTION OF THE DRAWINGS

Referring now to the attached drawings which form a part of this original disclosure.

DETAILED DESCRIPTION

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
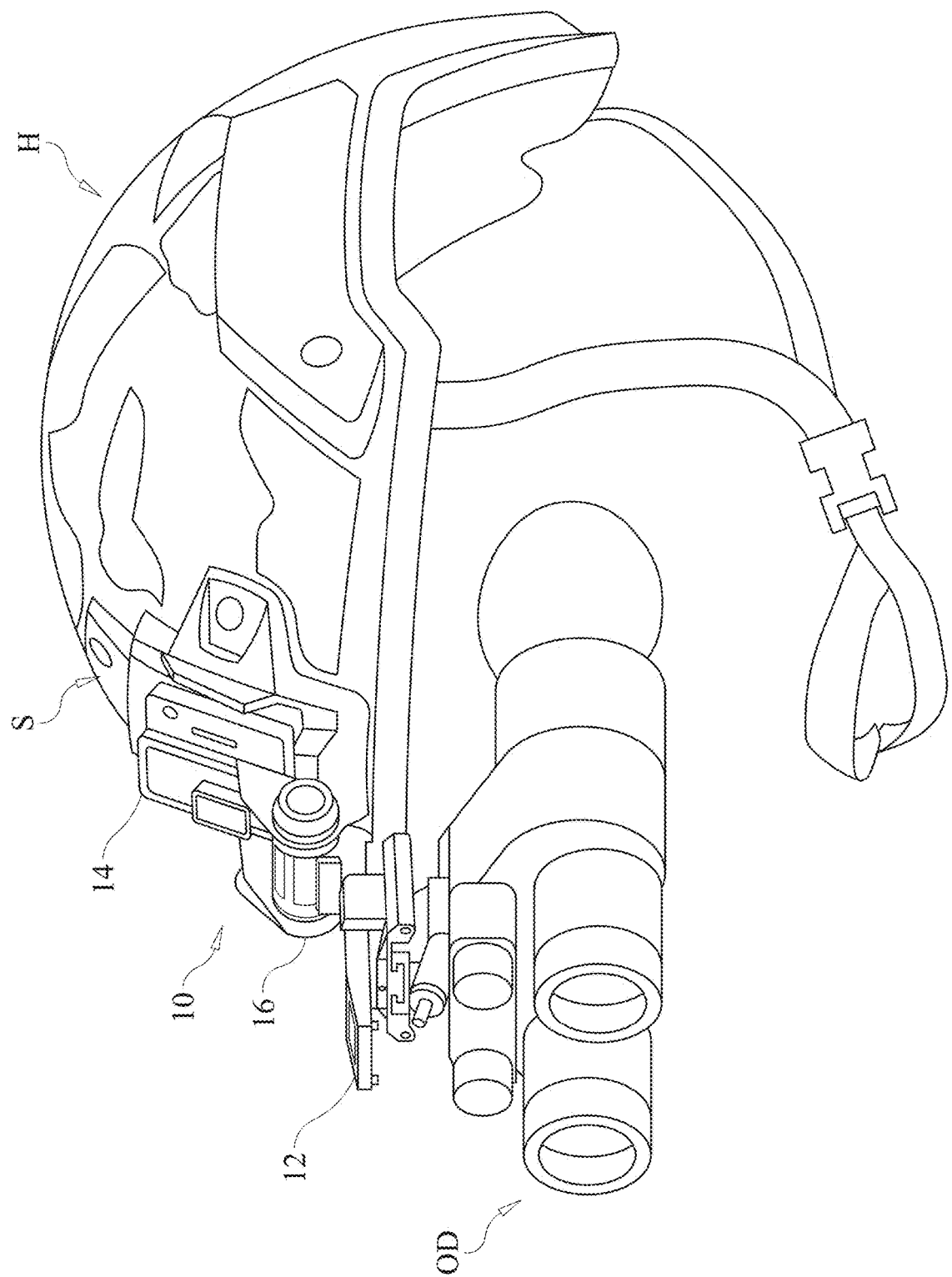
FIG. 1 is a front perspective view of an example embodiment of a helmet mount assembly attaching an optical device to a helmet, with the helmet mount assembly orienting the optical device in a deployed position.
Figure 2:
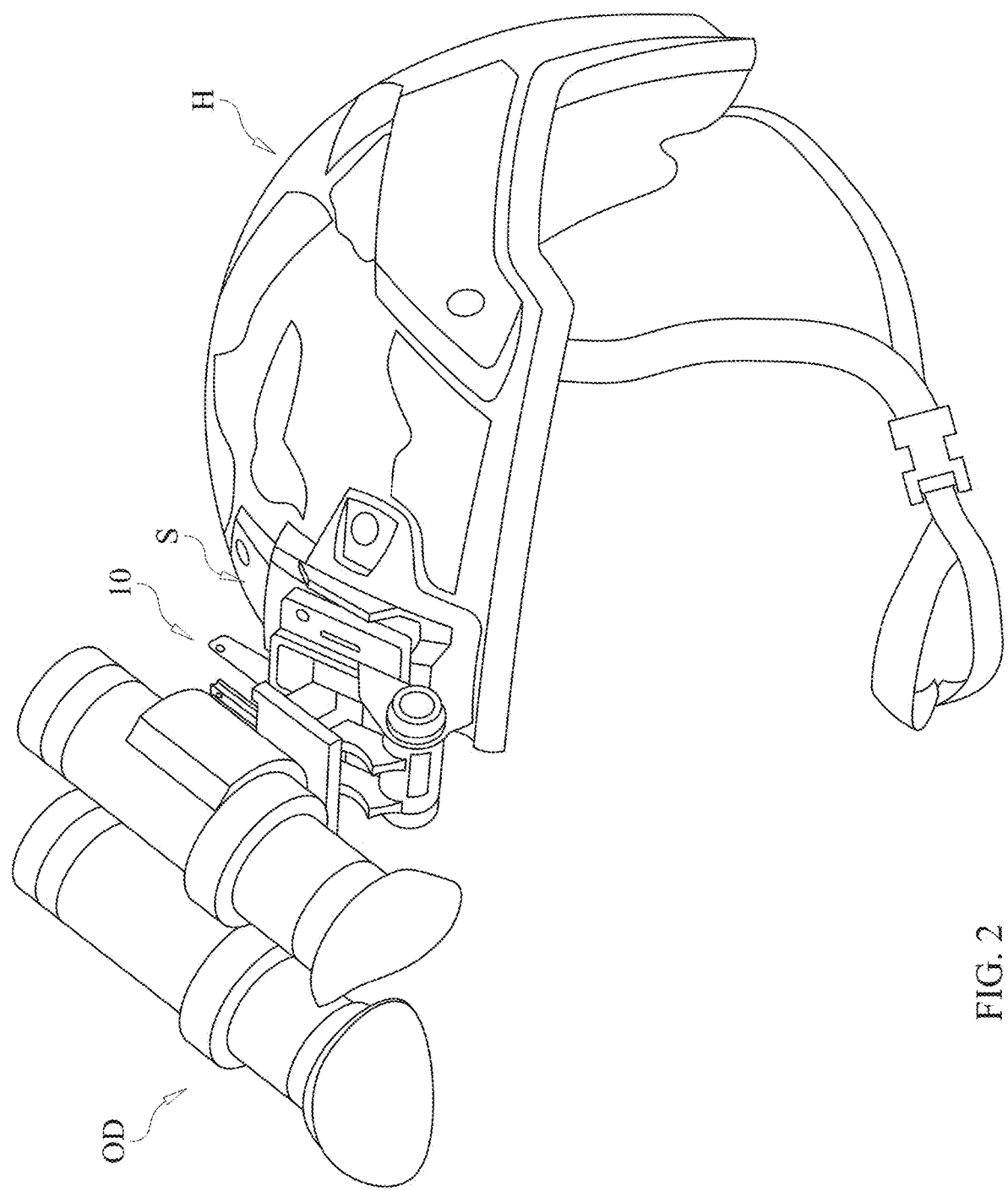
FIG. 2 is another front perspective view of the helmet mount assembly attaching the optical device to the helmet, with the helmet mount assembly orienting the optical device in a stowed position.
Figure 3:
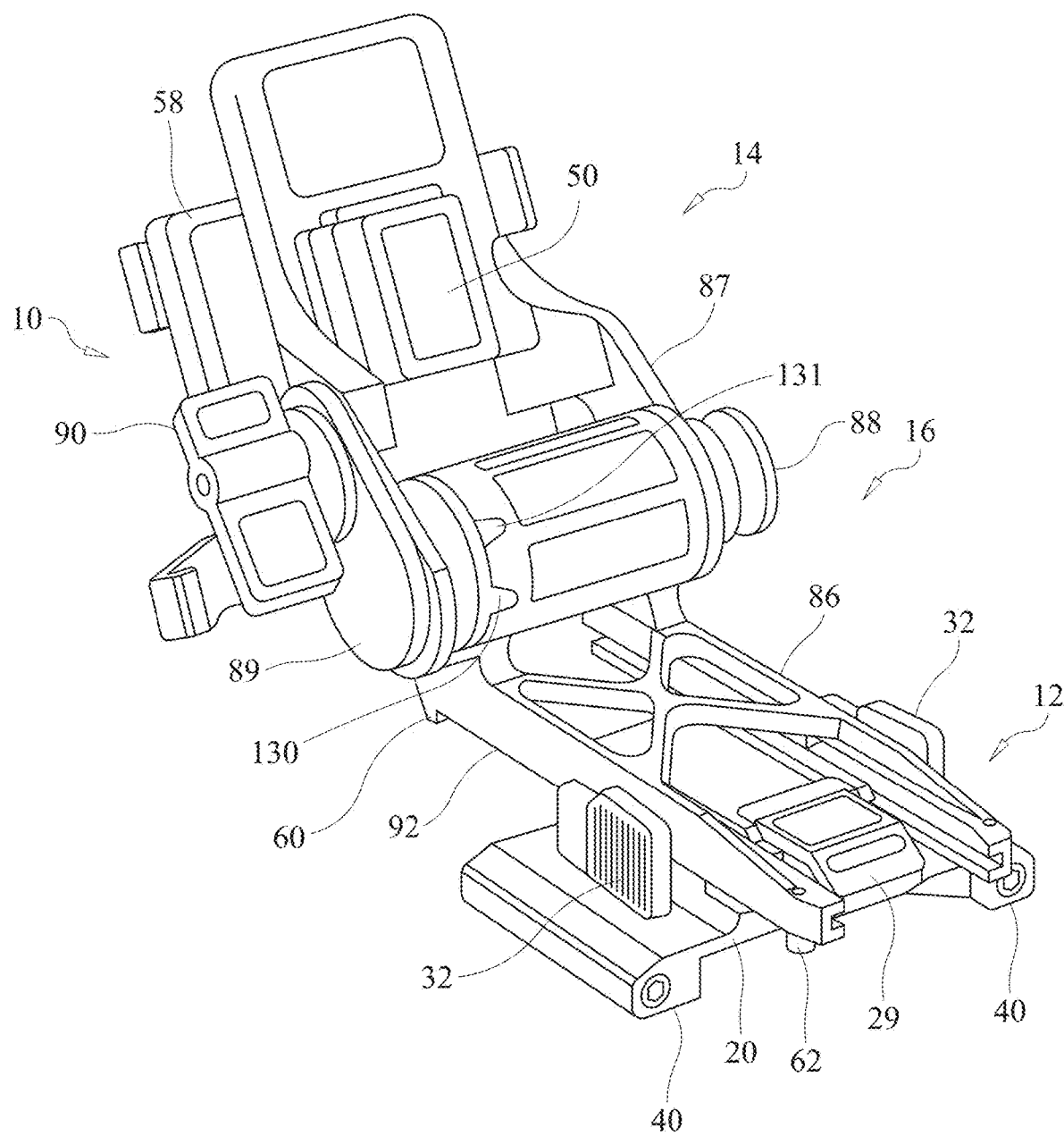
FIGS. 3 to 5 are alternative perspective views of the helmet mount assembly in the deployed position without a helmet or an optical device attached.
Figure 4:
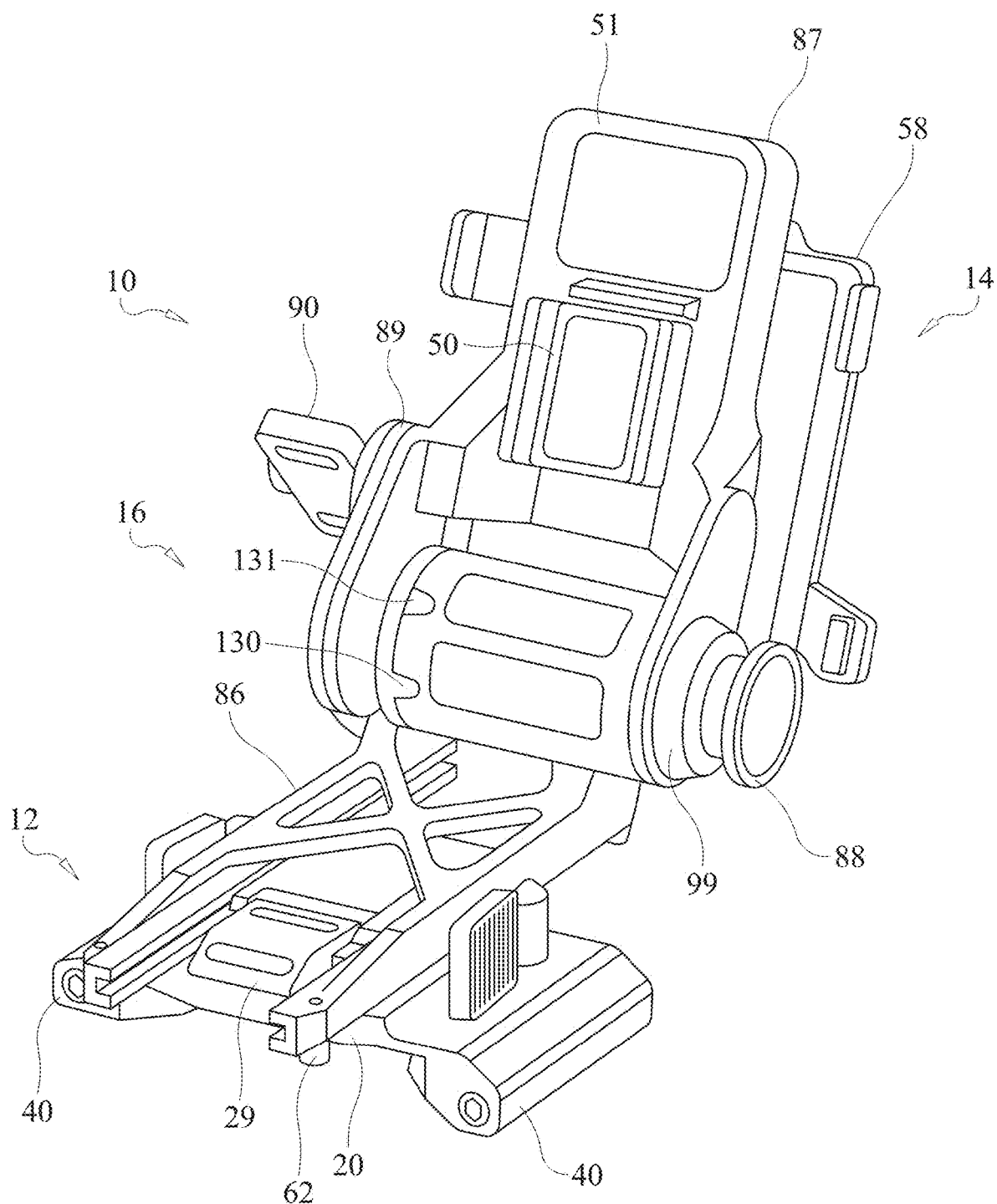
Figure 5:
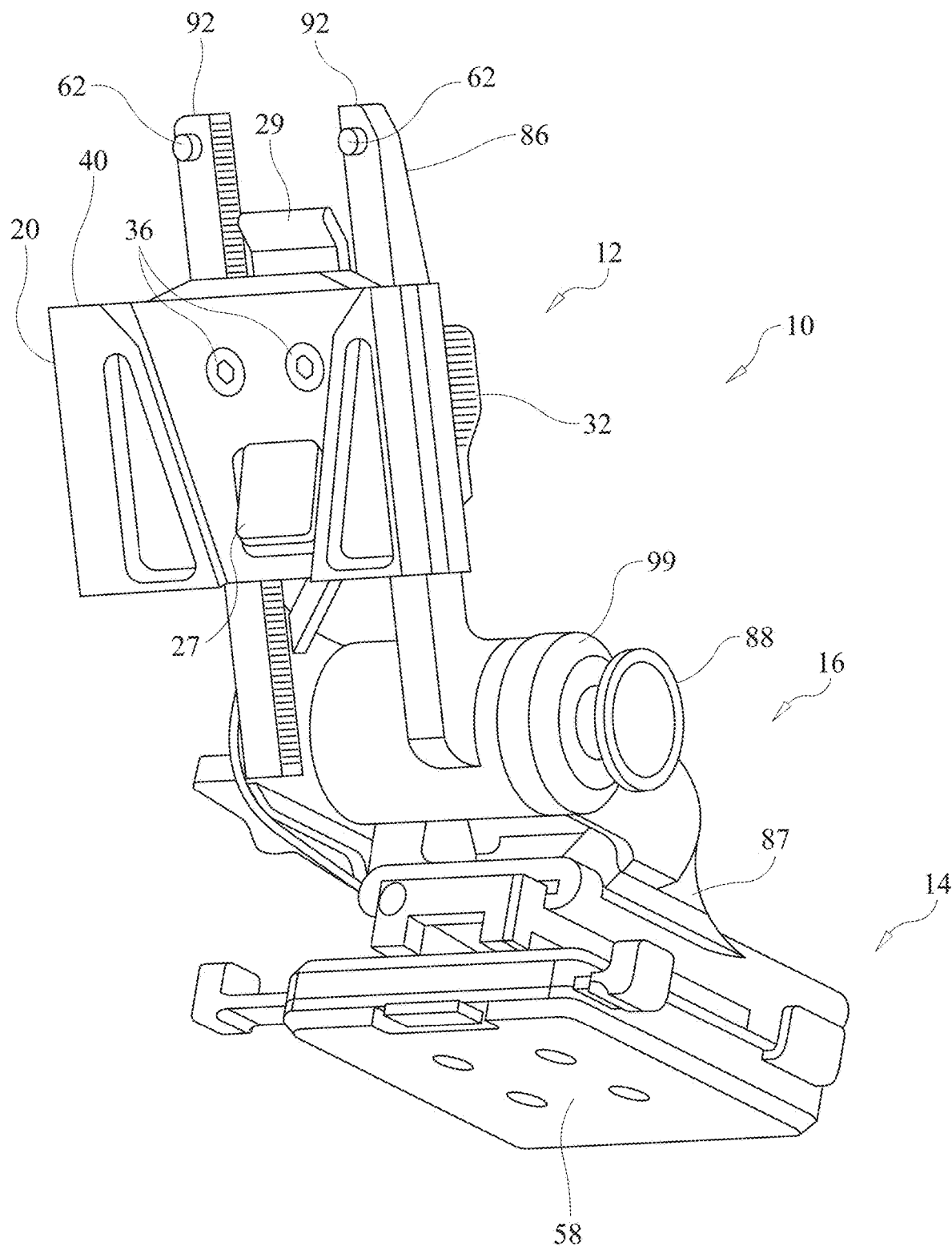
Figure 6:
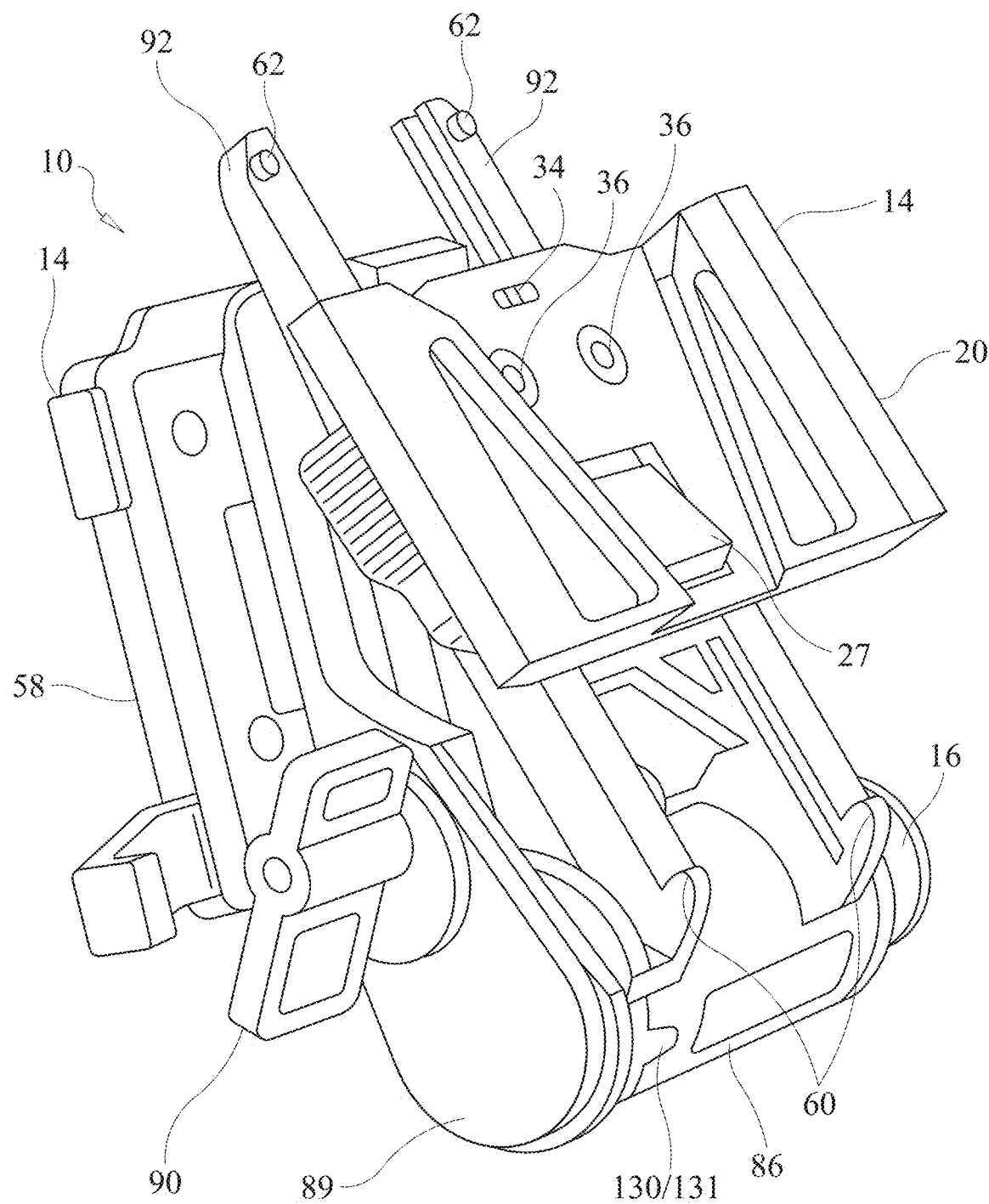
FIG. 6 is a perspective view of the helmet mount assembly in the stowed position without a helmet or an optical device attached.
Figure 7:
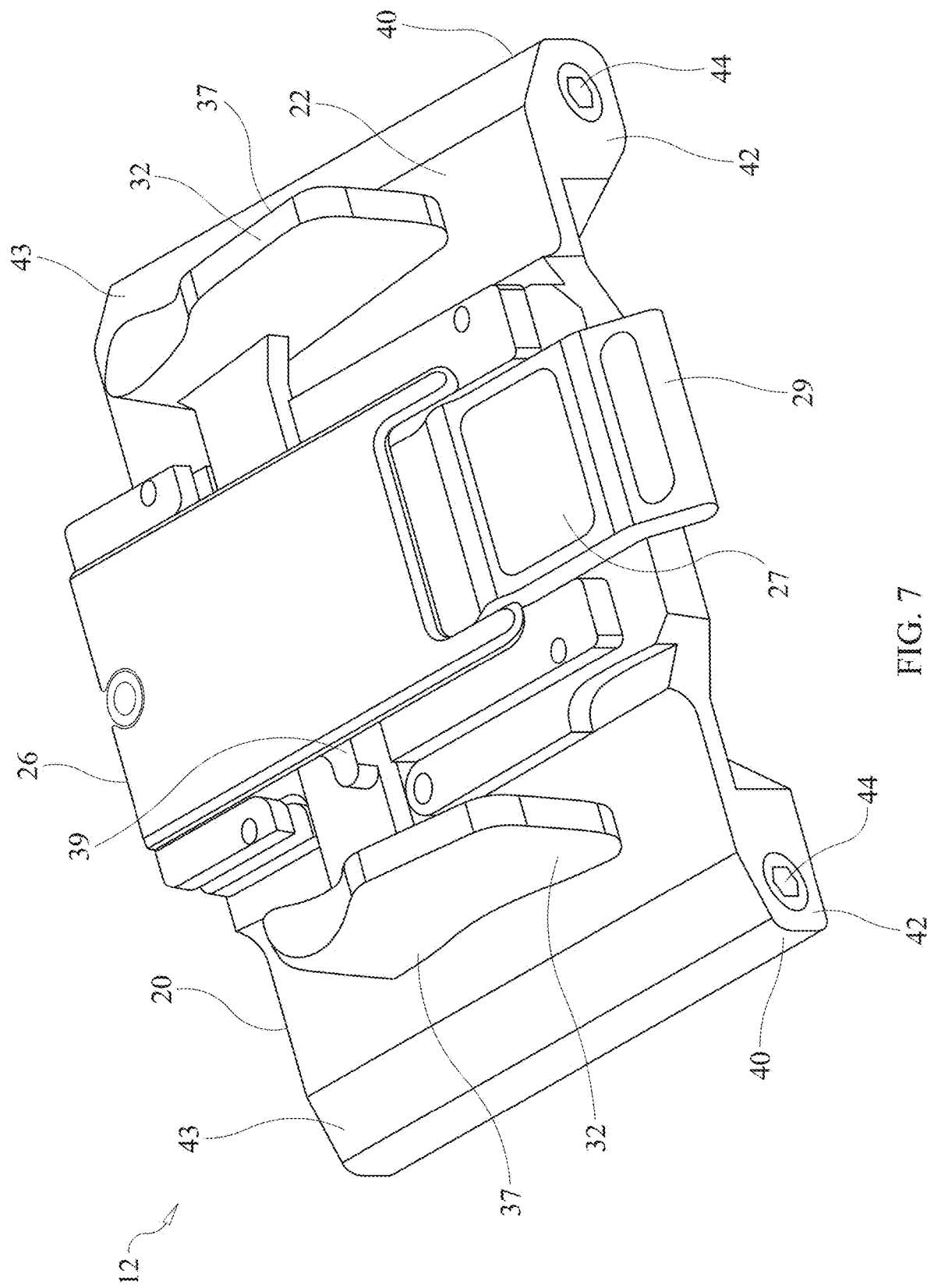
FIG. 7 is a perspective view of a device mount which forms part of the helmet mount assembly disclosed herein.

FIGS. 1 and 2 illustrate an example embodiment of a helmet mount assembly 10 attached to an optical device OD at one end and the shroud S of a helmet H at the other end. The helmet mount assembly 10 provides multiple degrees of freedom for adjusting the position and orientation of the optical device OD relative to the helmet H. FIG. 1 shows the optical device OD placed in a deployed position at the eye level of the person wearing the helmet H, while FIG. 2 shows the optical device OD placed in a stowed position above the helmet H and above the eye level of the person wearing the helmet H. In the illustrated embodiment, the optical device OD is a pair of night vision goggles, but the disclosed helmet mount assembly 10 is configured to mount a variety of different optical devices OD of different sizes to a variety of different helmets H and enable the optical devices OD to be adjusted to appropriate eye levels as needed.

FIGS. 3 to 6 show the helmet mount assembly 10 in more detail. In the illustrated embodiment, the helmet mount assembly 10 generally includes a device mount 12, a helmet mount 14, and a pivot structure 16. The pivot structure 16 connects the device mount 12 to the helmet mount 14. The pivot structure (i) enables the device mount 12 to be adjusted between the deployed position and the stowed position, and (ii) then enables the relative position of the device mount 12 to be fine-tuned for the specific person wearing the helmet H. In other words, the combination of the device mount 12, the helmet mount 14 and the pivot structure 16 enable the optical device OD to be adjusted in various horizontal, vertical and rotational positions with respect to the helmet H, so that the person wearing the helmet H can raise, lower, move closer or move away the optical device OD from the helmet H as needed for the person's eye level and head size.

Figure 8:
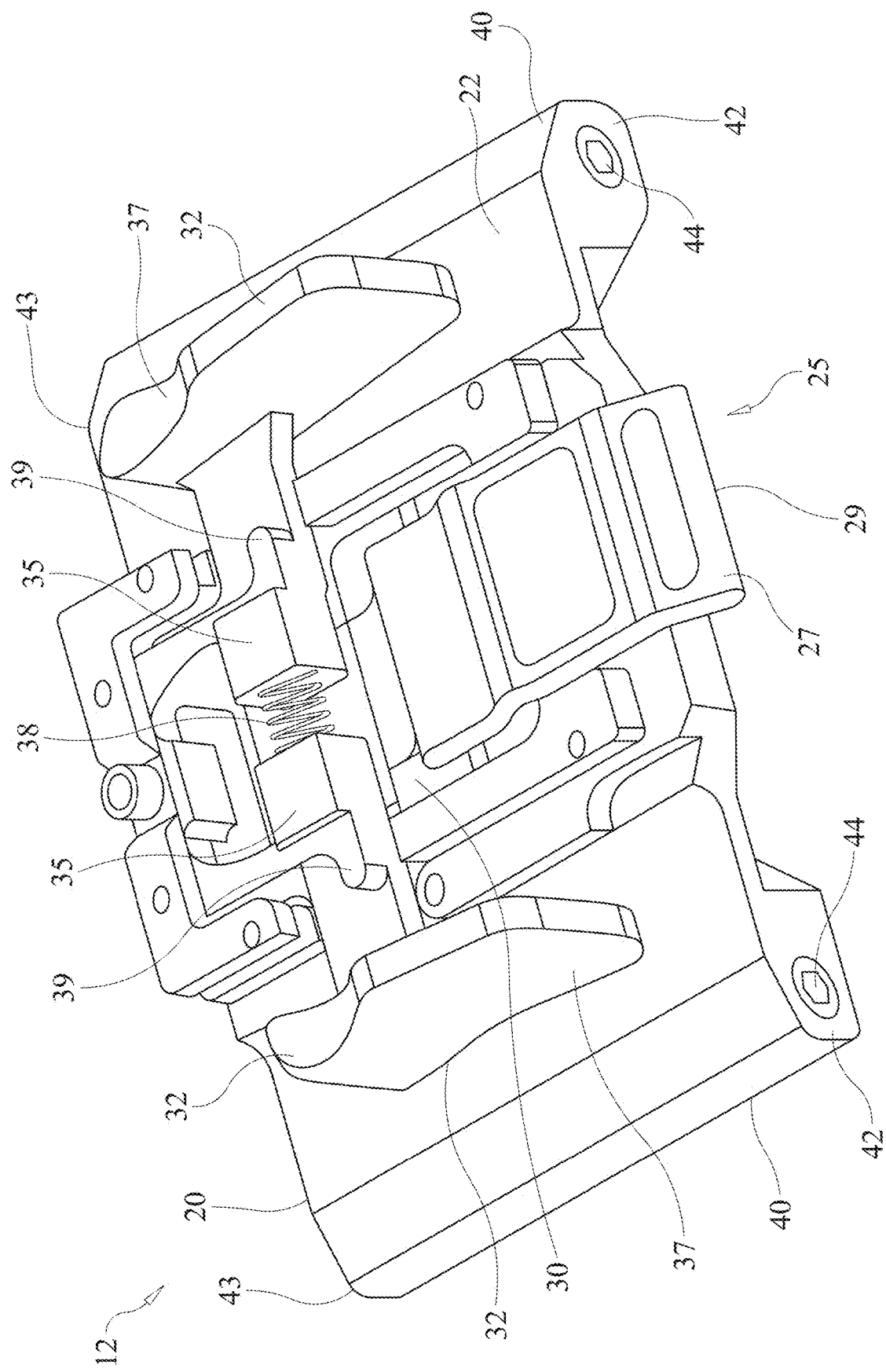
FIG. 8 is another perspective view of the device mount, with certain parts omitted for convenience.
Figure 9:
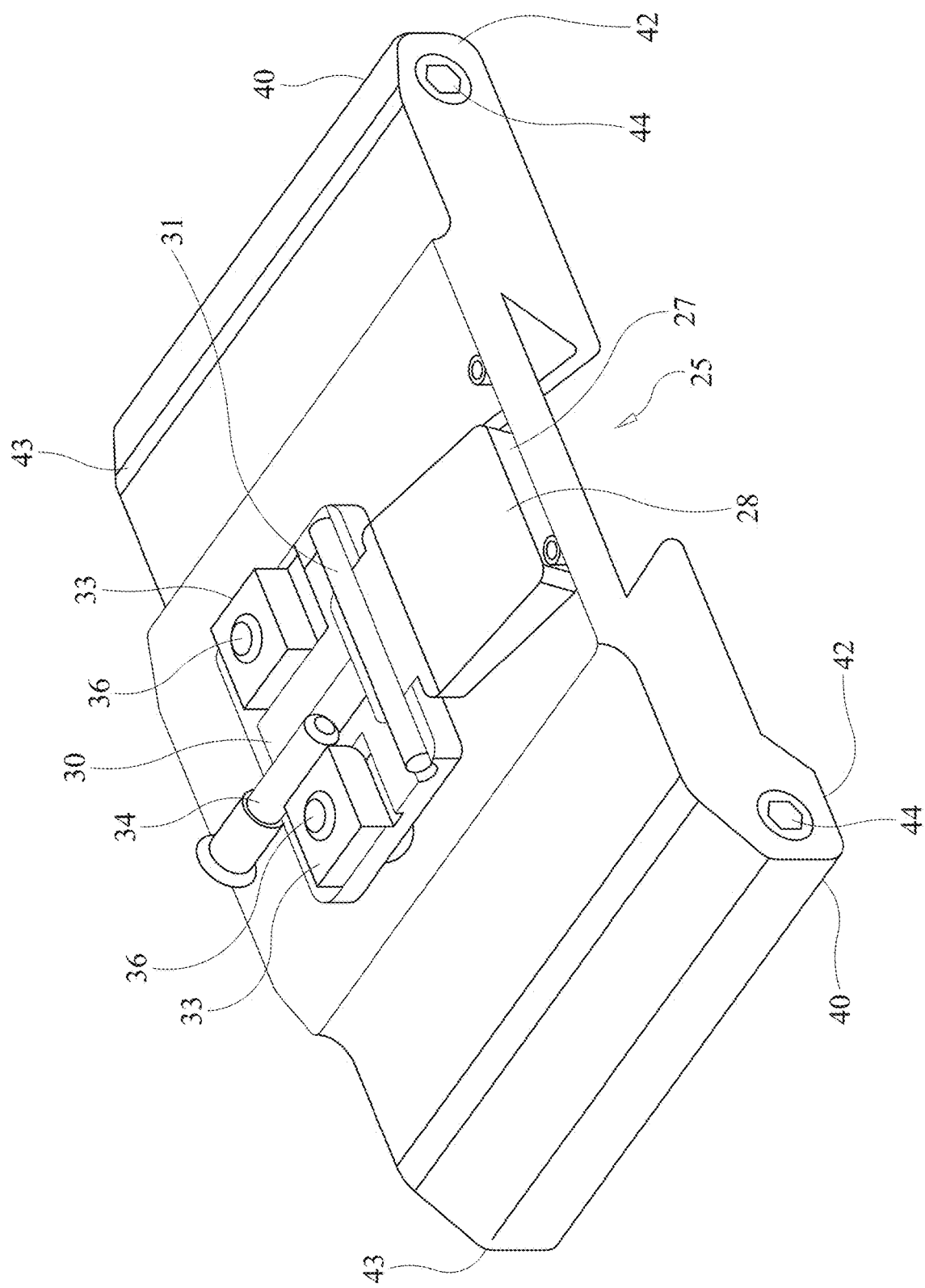
FIG. 9 is another perspective view of the device mount, with certain parts omitted for convenience.

FIGS. 7 to 10 illustrate the device mount 12 in more detail. The device mount 12 is configured to removably attach to a plurality of optical devices OD. In the illustrated embodiment, the device mount 12 includes a housing 20 having a first side 22 and a second side 24. The device mount 12 further includes a release mechanism 25 extending through the center of the housing 20. The device mount 12 is configured to attach to an optical device OD on the second side 24, and the release mechanism 25 is configured to lock the optical device OD into the device mount 12 and release the optical device OD from the device mount 12. The device mount 12 further includes a cover plate 26 attached on the first side 22 that partly covers the release mechanism 25 to protect the inner components. FIG. 8 illustrates the device mount 12 with the cover plate 26 removed to show the inner components of the release mechanism 25.

In the illustrated embodiment, the release mechanism 25 includes a release lever 27 having a locking tooth 28 and an actuator 29 on opposite ends. The release lever 27 is pivotally connected to the housing 20. The locking tooth 28 protrudes from the second side 24 of the device mount 12, and the actuator 29 protrudes from the first side 22 of the device mount 12. Actuating the release lever 27 causes the locking tooth 28 to move from a locked position in which the locking tooth 28 engages an optical device OD to a retracted position in which the locking tooth 28 releases the optical device OD. From the perspective of FIG. 10, pressing the actuator 29 downward causes the locking tooth 28 to retract into the housing 20 (here, upward) to release an optical device OD from the device mount 12. From the perspective of FIG. 11, the optical device slides downward along the second side 24 to be locked into place by the locking tooth 28.

The illustrated device mount 12 enables the release lever 27 to be adjusted to accommodate manufacturing tolerances from various sources. As seen for example in FIGS. 9 and 10, the release mechanism 25 includes a mounting plate 30 and an axle 31. The release lever 27 is pivotally mounted to the mounting plate 30 by the axle 31 and pivots around the center axis of the axle 31.

Figure 10:
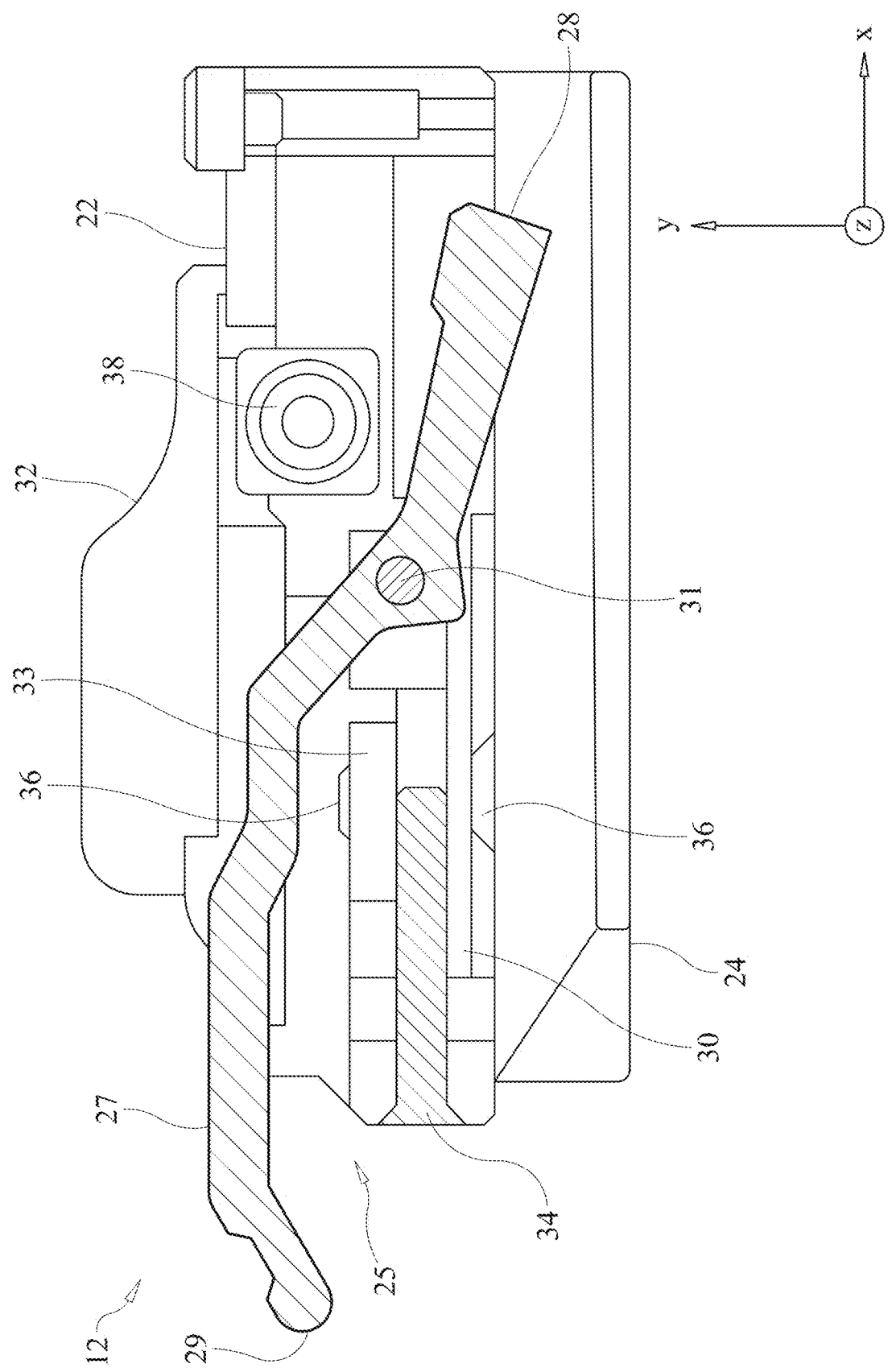
FIG. 10 is a cross-sectional view taken through the center of the device mount.
Figure 11:
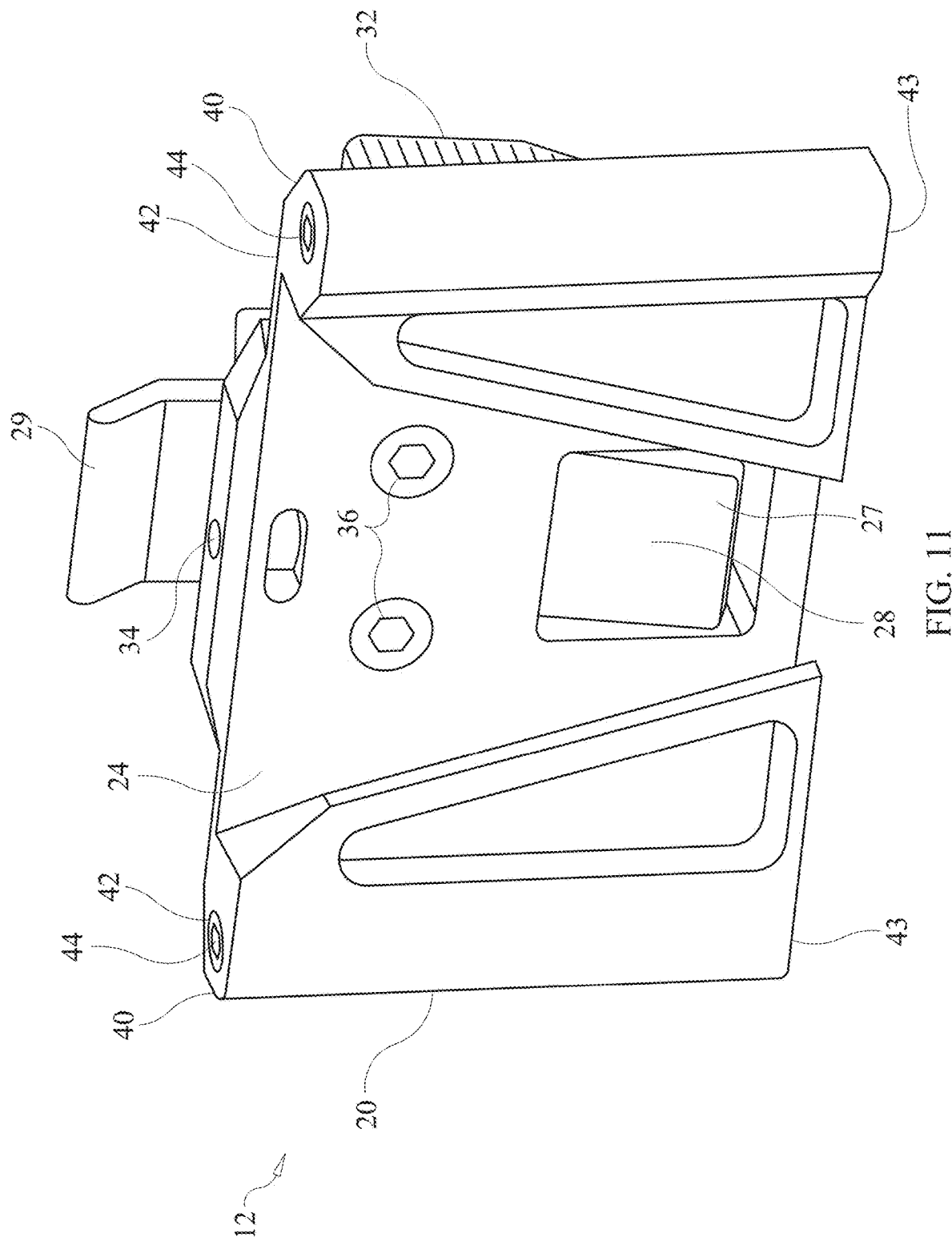
FIG. 11 is another perspective view of the device mount from the opposite side of FIGS. 8 and 9.

The pivot point of the release lever 27 is adjustable with respect to the housing 20 to alter the relative positioning of the locking tooth 27 when in the locked position or the retracted position. The release mechanism 25 includes a first positioning screw 34 and two second positioning screws 36 for adjusting the pivot point. From the perspective of FIG. 10, the first positioning screw 34 screws into and out of a pilot hole in the x direction to adjust the x direction positioning of the mounting plate 30 within the housing 20, and the second positioning screws 36 screw in the y direction to tighten and loosen the mounting plate 30 within the housing 20. As seen in FIG. 10, the second positioning screws 36 screw upward through the lower face of the mounting plate 30 and into brackets 33. A user can adjust the x direction positioning of the release lever 27 by loosening the second positioning screws 36 to allow the mounting plate 30 to move in the x direction, then adjusting the first positioning screw 34 in either direction (+x or −x) to adjust the horizontal positioning of the mounting plate 30 within the housing 20, and then tightening the second positioning screws 36 to fix the mounting plate 30 into the new position. As the mounting plate 30 moves in the x direction, so does the release lever 25 and the axle 31, which moves the pivot point of the release lever 27 and thus the relative positioning of the locking tooth 28.

The device mount 12 is moveably connected to the pivot structure 16 so as to linearly translate along the pivot structure 16 and lock into at various locations along the length of the pivot structure 16. As seen for example in FIGS. 7 and 8, the device mount 12 includes a pair of actuating arms 32. The actuating arms 32 extend outwardly from the center of the device mount 12 on the first side 22. More specifically, the actuating arms 32 extend from an inner portion 35 to an outer portion 37. The respective inner portions 35 of the actuating arms 32 are connected by a biasing member 38 (here, a spring), which biases the actuating arms 32 away from each other. The inner portions 35 further include outward facing protrusions 39 that interact with opposing tracks 94 of the pivot structure 16 to lock the device mount 12 into different positions along the tracks 94. To adjust the positioning of the device mount 12 along the pivot structure 16, a user squeezes the actuating arms 32 together, moves the device mount 12 linearly along the tracks 94, and then releases the actuating arms 32 when the device mount 12 is in a desired position to cause the outward facing protrusions 39 to lock the device mount 12 into the tracks 94. This linear motion generally brings the helmet mount 12 and the connected optical device OD closer to or farther away from the eyes/face of the person wearing the helmet H (generally horizontal in FIG. 1). First protrusions 60 and second protrusions 62 are located at the opposite ends of the tracks 94 and prevent the device mount 12 from leaving the tracks 94 if translated too far in either direction.

Figure 12:
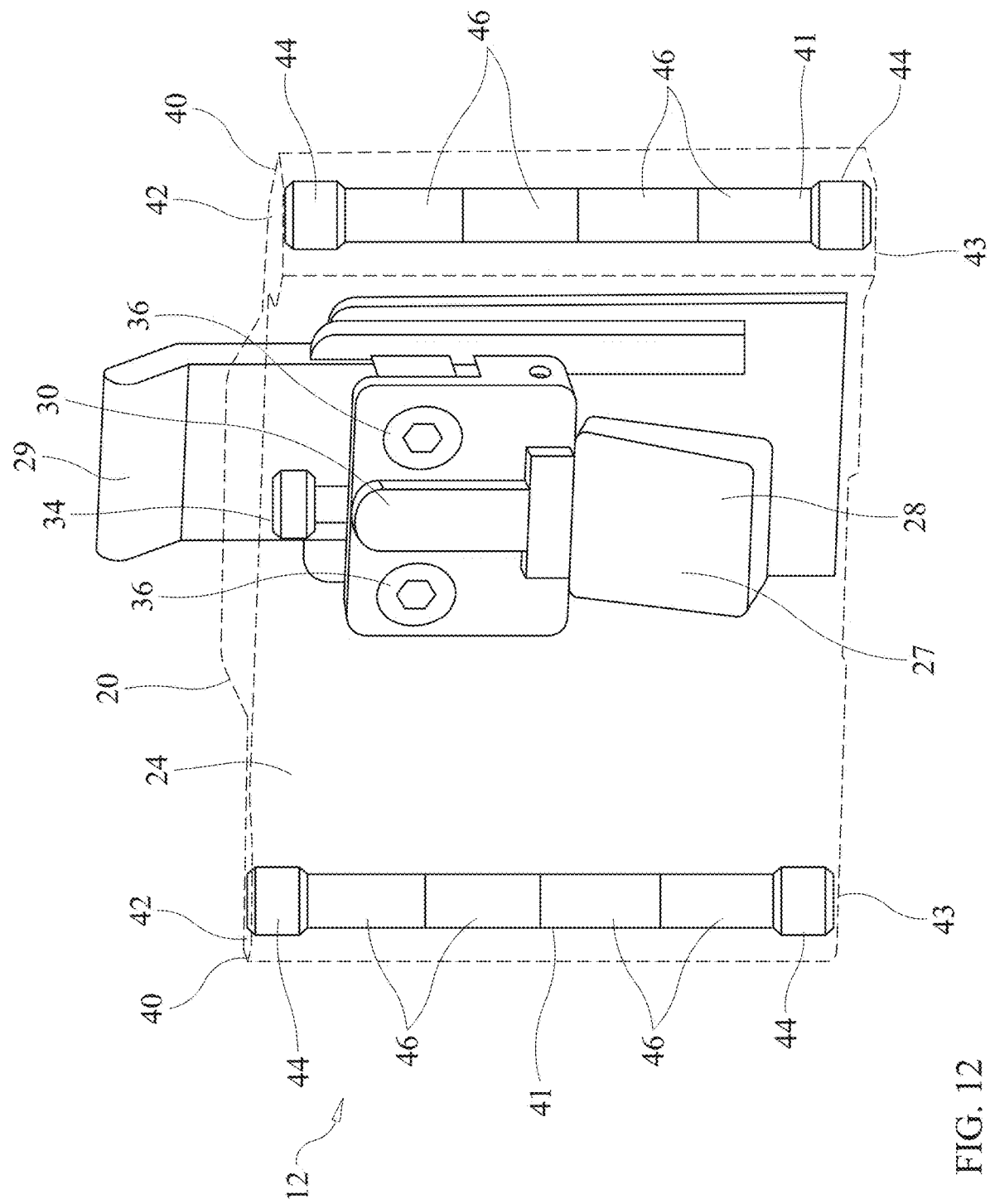
FIG. 12 is another perspective view of the device mount, with certain parts omitted for convenience.

As seen in FIG. 12, the device mount 12 includes a plurality of magnets 46. More specifically, the opposite sides 40 of the housing 20 each include an inner column space 41 extending through the housing 20 from a first side 42 to a second side 43, with the plurality of magnets 46 located within the inner column spaces 41. Caps 44 on each of the first side 42 and the second side 43 can be removed, enabling a person to remove, rearrange and/or replace magnets 46 as needed. That is, the person can unscrew the caps 44 from the housing 20 and then remove, rearrange and replace the magnets 46. The magnets 46 are typically used by the mounted optical device OD to determine whether it has been mounted or not. By having the freedom to reconfigure the magnets 46, the user can adjust the strength and direction of magnetic field(s) depending on the type and size of the optical device OD, so that the optical device OD can be able to reliably detect its state as mounted on or unmounted off the helmet mount 10.

Figure 13:
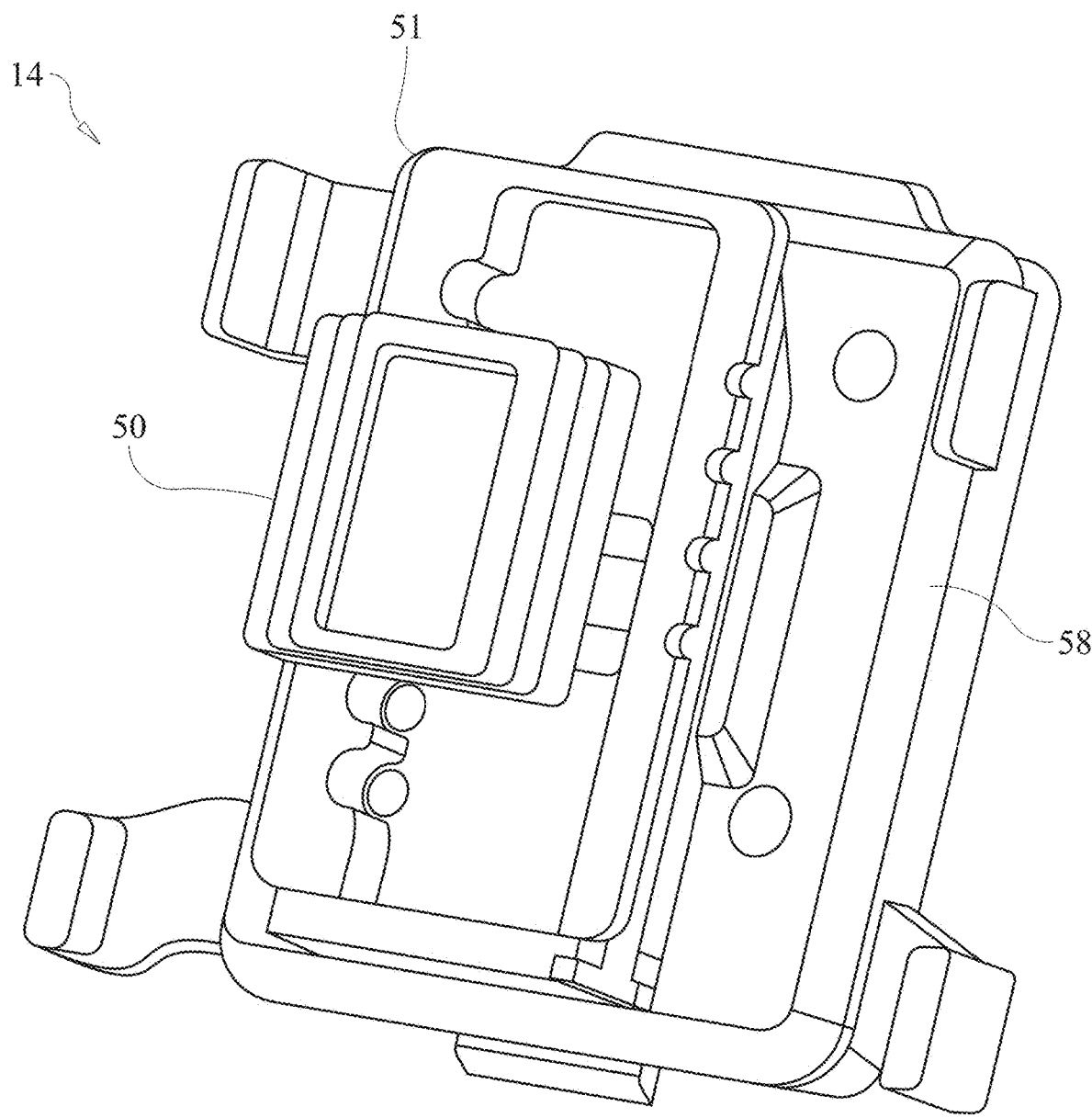
FIG. 13 is a perspective view of a helmet mount which forms part of the helmet mount assembly disclosed herein.
Figure 14:
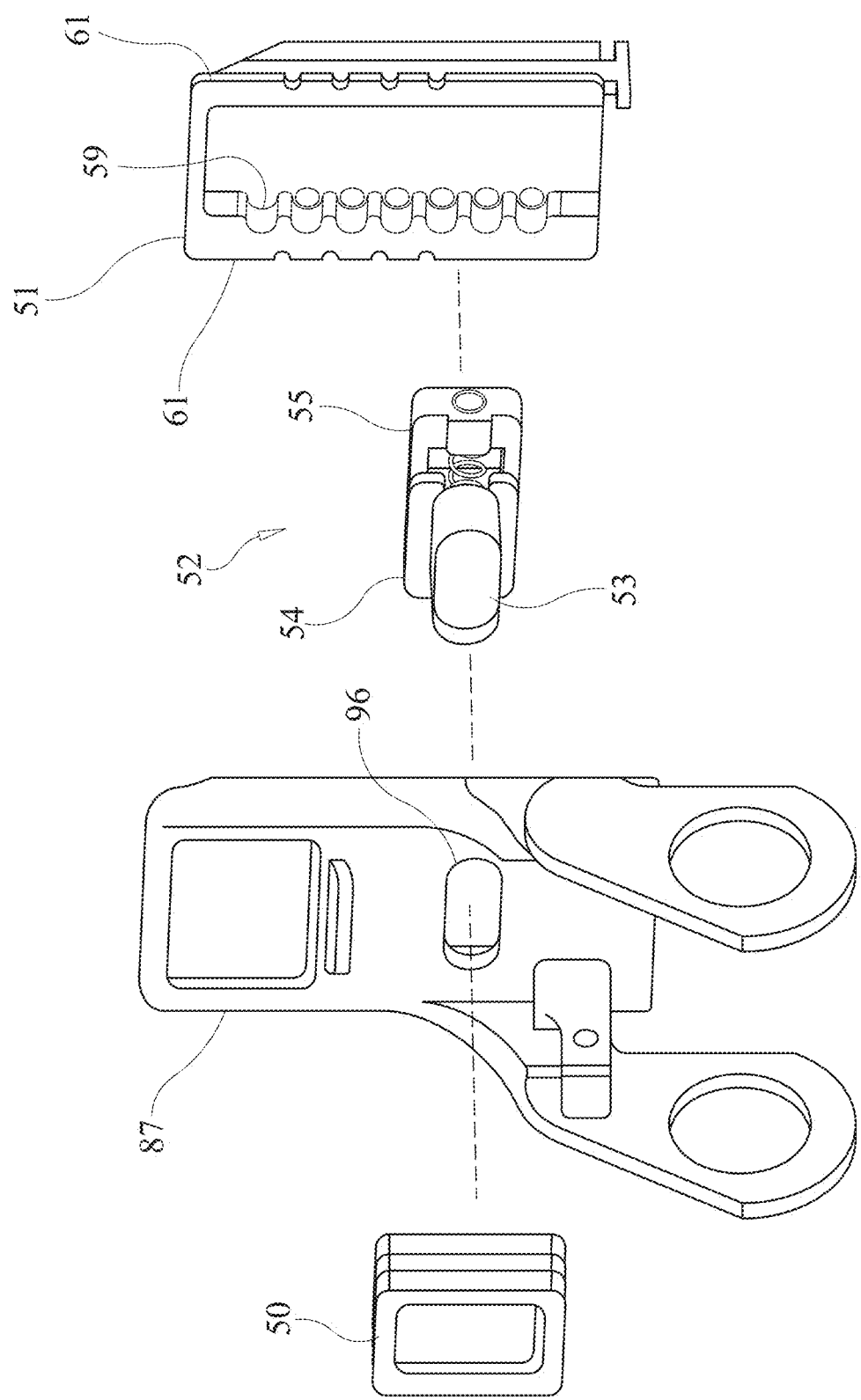
FIG. 14 is an exploded perspective view of certain parts of the helmet mount.
Figure 15:
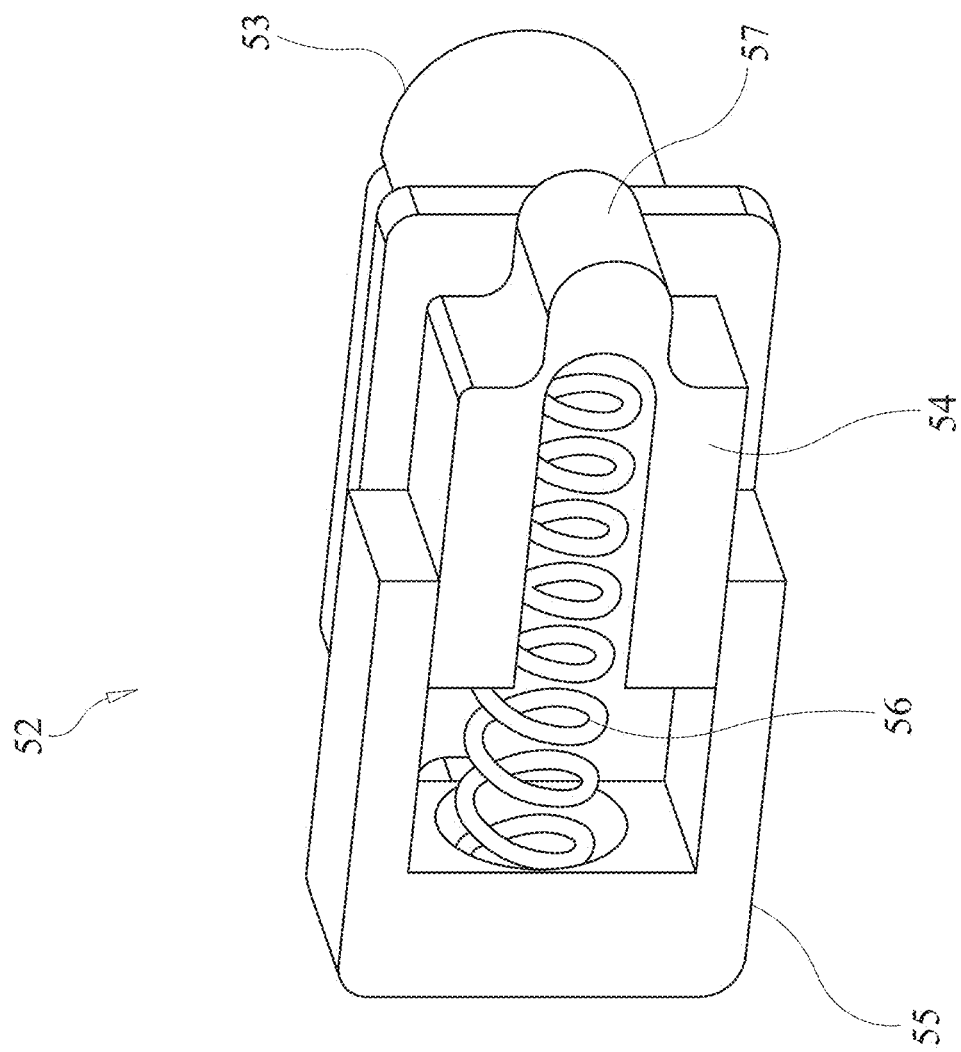
FIG. 15 is a rear perspective view of the locking mechanism shown in FIG. 14.
Figure 16:
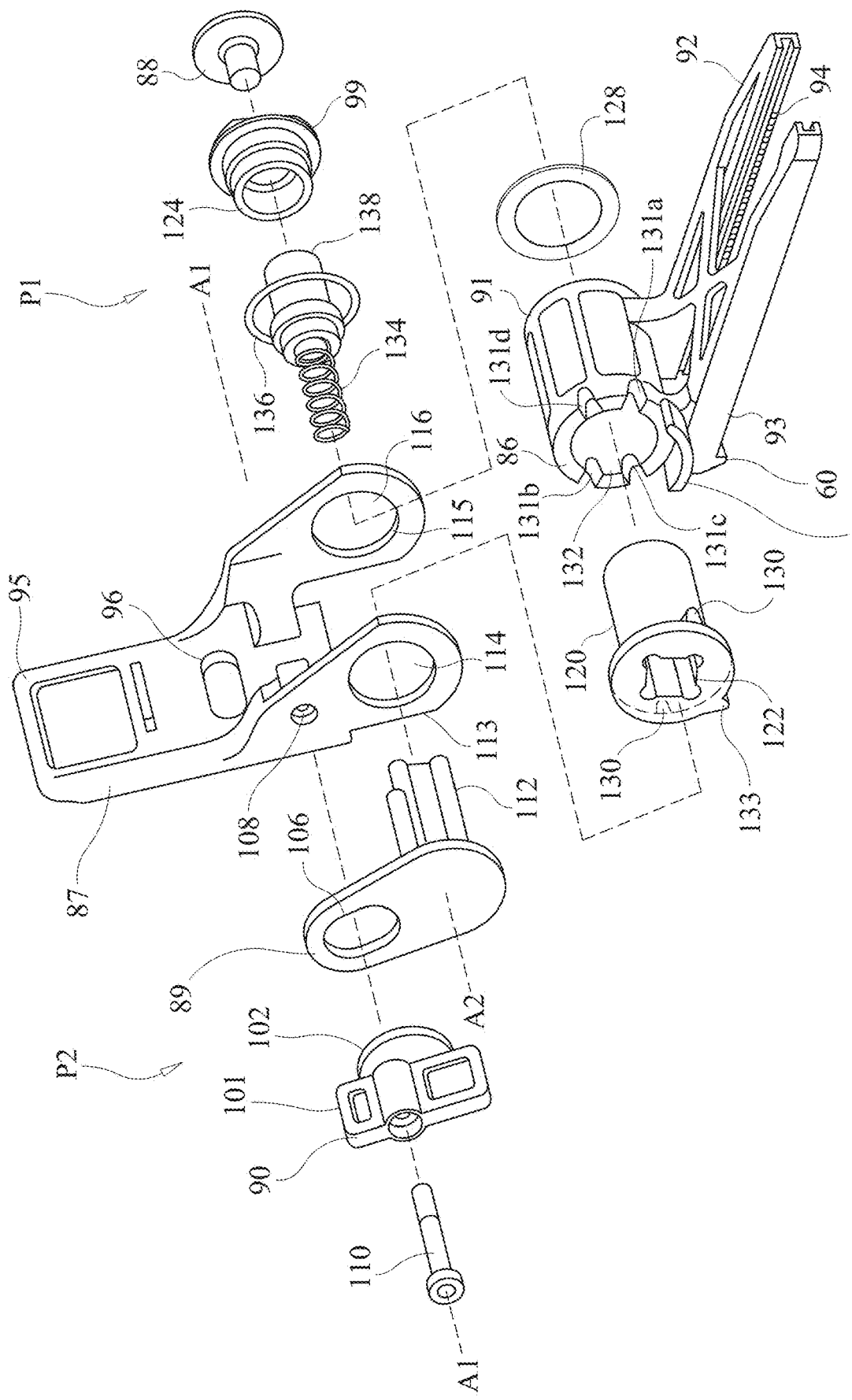
FIG. 16 is an exploded view of a pivot structure which forms part of the helmet mount assembly.
Figure 17:
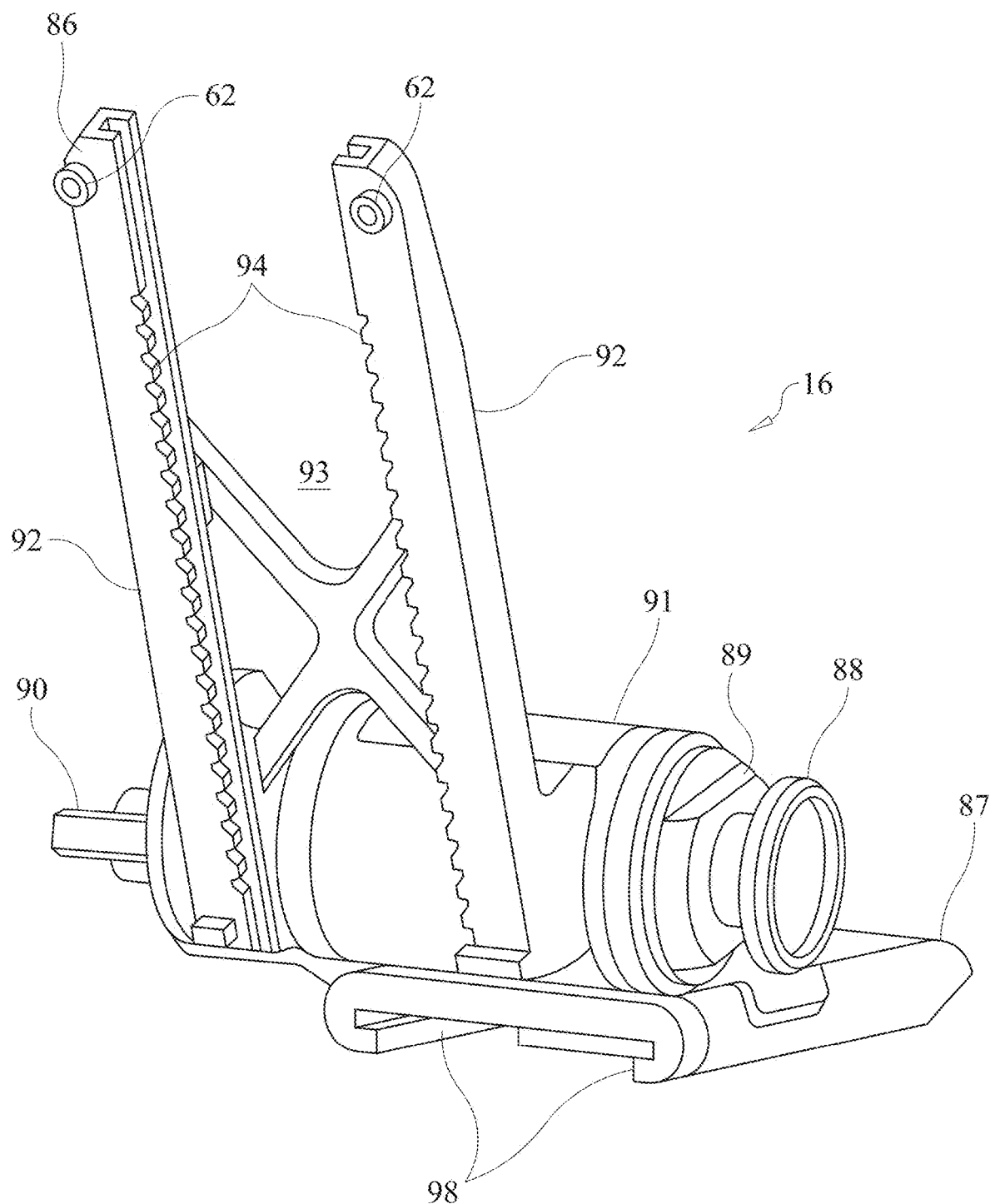
FIGS. 17 and 18 are alternative perspective views of the pivot structure in the deployed position.
Figure 18:
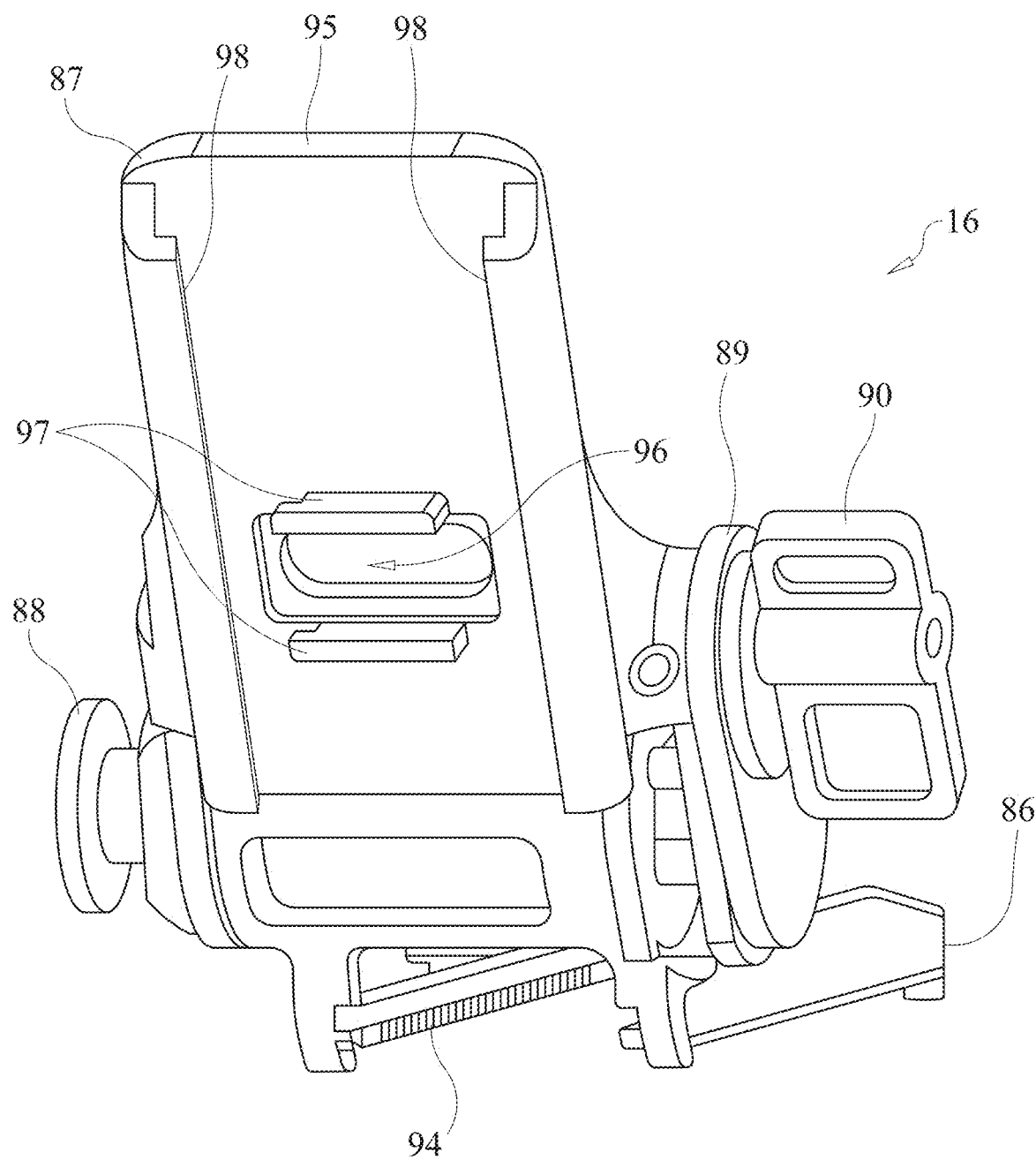

FIGS. 13 to 15 illustrate the helmet mount 14 in more detail. The helmet mount 14 is configured to removably attach to a plurality of helmets H. The helmet mount 14 is also moveably connected to the pivot structure 16 so as to linearly translate with respect to the pivot structure 16. From the perspective of FIGS. 1 and 2, the helmet mount 14 translates generally vertically relative to the pivot structure 16 to vertically position the optical device OD attached to the device mount 12 with respect to the helmet H.

As seen in FIGS. 13 to 15, the helmet mount 14 generally includes a slide button 50, a slide plate 51, and a locking mechanism 52. The locking mechanism 52 includes an aperture extension 53, a moving part 54, a fixed part 55 and a biasing mechanism 56 (here, a spring). As seen in FIG. 14, the aperture extension 53 fits through an aperture 96 in the helmet mount part 87 of the pivot structure 16 and is fixed to the slide button 50, for example, by a bolt or screw. The fixed part 55 is fixed to the helmet mount part 87. The biasing mechanism 56 is located between the moving part 54 and the fixed part 55 and biases the moving part 54 away from the fixed part 54. The moving part 54 has a locking protrusion 57 on one end, and the slide plate 51 has a plurality of locking indentations 59 configured to receive the locking protrusion 57. The biasing mechanism 56 biases the locking protrusion 57 into an adjacent locking indentation 59. When a person slides the slide button 50 against the biasing force of the biasing mechanism 56, the locking protrusion 57 is released from the locking indentations 59. The person can then move the slide plate 51 linearly with respect to the slide button 50, the locking mechanism 52 and the helmet mount part 87 (up/down in FIG. 14). When the person releases the slide button 50, the biasing mechanism 56 biases the locking protrusion 57 into the adjacent locking indentation 59 of the slide plate 51 to lock the helmet mount 14 back into place along the pivot structure 16.

In the illustrated embodiment, the helmet mount 14 further includes a shroud mount 58. The shroud mount 58 is configured to lock into the shroud S of the helmet H and can generally include locking and breakaway features as known in the art. The slide plate 51 is fixed to the shroud mount 58, such that the shroud mount 58 is locked into position with respect to the helmet mount part 87/pivot structure 16 when the locking mechanism 52 is locked to the slide plate 51 as described above.

FIGS. 3 to 6 and 16 to 19 illustrate the pivot structure 16 in more detail. In the illustrated embodiment, the pivot structure 16 generally includes a device mount part 86 and a helmet mount part 87. The pivot structure 16 also generally includes a first pivot adjustment mechanism P1 and a second pivot adjustment mechanism P2. The pivot adjustment mechanisms P1, P2 adjust the rotational position of the device mount part 86 with respect to the helmet mount part 87. The first pivot adjustment mechanism P1 is configured to move the device mount 12 between the deployed position (FIG. 1) and the stowed position (FIG. 2). The second pivot adjustment mechanism P2 is configured to further fine-tune the rotational position of the device mount 12 when the device mount 12 is placed in the deployed position. The device mount part 86 also enables linear translation of the device mount 12 with respect to the pivot structure 16, and the helmet mount part 87 also enables linear translation of the helmet mount 14 with respect to the pivot structure 16.

The device mount part 86 enables linear translation of the device mount 12 with respect to the pivot structure 16 to bring the device mount 12 closer to or farther away from the user's face when worn with a helmet H. In the illustrated embodiment, the device mount part 86 includes two elongated rails 92 creating an inner track surface 94 having a plurality of teeth. The device mount 12 attaches to the device mount part 86 within the space 93 between the elongated rails 92, such that the outward facing protrusions 39 on the actuating arms 32 of the device mount 12 interact with the track surface 94 to lock the device mount 12 into a relative position along the rails 92. A user moves the device mount 12 back and forth in the liner direction by squeezing the actuating arms 32 towards each other and translating the device mount 12 along the tracks 92. When the device mount 12 is in a desired position along the tracks 92, the user releases the actuating arms 32 and the protrusions 39 lock the device mount 12 into the tracks 92 in that location. The device mount part 86 further includes first protrusions 60 and second protrusions 62, which prevent the device mount 12 from leaving the tracks 94 if translated too far in either direction.

In the illustrated embodiment, the device mount part 86 also includes a barrel 91 having a plurality of protrusions 131 around the outer circumference thereof. The barrel 91 enables the first pivot adjustment mechanism P1 to move the helmet mount assembly 10 between the deployed position (FIG. 1) and the stowed position (FIG. 2), as discussed in more detail below.

The helmet mount part 87 enables linear translation of the helmet mount 14 with respect to the pivot structure 16 to move the relative vertical position of the optical device OD with respect to the eye level of the person wearing the helmet H. In the illustrated embodiment, the helmet mount part 87 includes a plate 95 having a laterally extending central aperture 96 therein, a sliding button attachment 97, and opposing tracks 98 creating a sliding space for the helmet mount 14. The outer edges 61 of the sliding plate 51 (see FIG. 14) slide within the opposing tracks 98 of the helmet mount part 87. As discussed above, the locking mechanism 52 attaches to the slide button 50 through the central aperture 96 via the actuator attachment 97. That is, the fixed part 55 of the locking mechanism 52 is fixed to the actuator attachment 97. To adjust the vertical positioning of the helmet mount 14, a user slides the slide button 50 horizontally against the biasing force of the biasing mechanism 56, which removes the locking protrusion 57 from the locking indentations 59 of the slide plate 51. The user can then translate the slide plate 51 and the attached shroud mount 58 linearly along the opposing tracks 98. When the user releases the slide button 50, the locking protrusion 57 is biased into the adjacent locking indentation 59 of the slide plate 51, which locks the sliding plate 51 and the helmet mount part 87 into that configuration, which causes the rest of the helmet mount 14 to be locked into that position with respect to the pivot structure 16.

Figure 19:
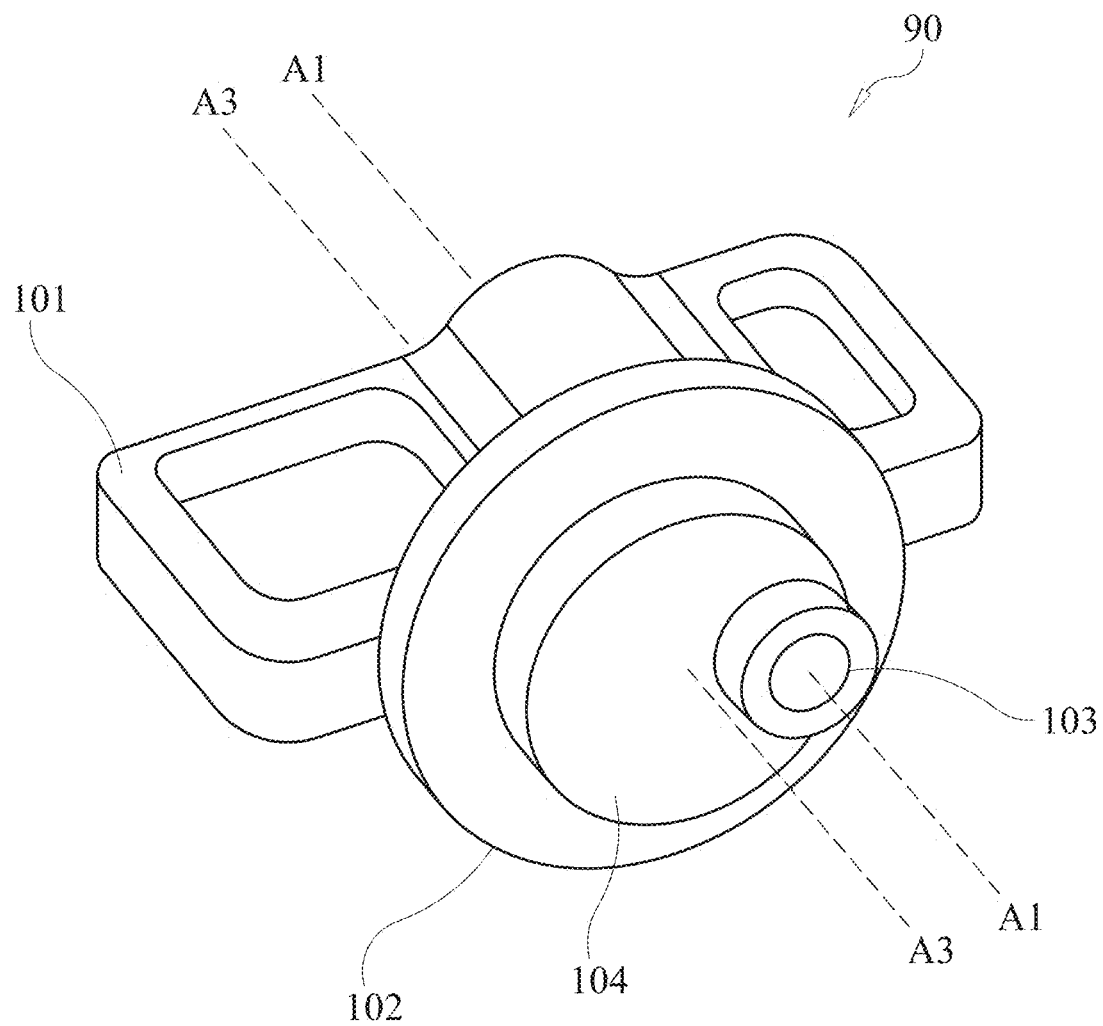
FIG. 19 is a perspective view of a knob which forms part of the pivot structure.

As seen in FIG. 19, the lower portion of the helmet mount part 87 includes a first side 113 having a first aperture 114 and a second side 115 having a second aperture 116. The center axis A2 through the first aperture 114 and the second aperture 116 is the rotational axis around which the device mount 12 pivots with respect to the helmet mount 14. Those of ordinary skill in the art will recognize from this disclosure that certain elements of the helmet mount part 87 can instead be placed on the device mount part 86 or be achieved with a separate part, and vice versa.

The first pivot adjustment mechanism P1 is configured to move the helmet mount 12 between the deployed position (FIG. 1) and the stowed position (FIG. 2). In the illustrated embodiment, the first pivot adjustment mechanism P1 extends through the second aperture 116 on the second side 115 of the helmet mount part 86. Here, the first pivot adjustment mechanism P1 generally includes one or more of an actuator 88 (e.g., a button), an actuator housing 99, a biasing mechanism 134, a stem 138 and a barrel cap 120. The actuator 88 (here, a button) is fixed to the stem 138, which extends through the second aperture 116 into the space 132 within the barrel 91 of the device mount part 86. The barrel cap 120 is located on the other side of the barrel 91, with the biasing mechanism 134 located between the barrel cap 120 and the stem 138. The inner side 124 of the actuator housing 99 is fixed against the helmet mount part 87 at the second aperture 116. Here, the first pivot adjustment mechanism P1 further includes an o-ring 136 between the actuator housing 99 and the second side 115 of the helmet mount part 86. The biasing mechanism 134 biases the stem 128 and the actuator/button 88 away from the second side 115 of the helmet mount part 87 into a locked position.

The user presses the actuator/button 88 toward the second side 115 of the helmet mount part 87 against the biasing force of the biasing mechanism 134 to move the helmet mount assembly 10 between the deployed position (FIG. 1) and the stowed position (FIG. 2). As seen in FIG. 19, the barrel cap 120 includes one or more protrusions 130, and the outer lip of the barrel 91 of the helmet mount part 86 includes corresponding indentations 131. Here, the barrel cap 120 includes two protrusions 130 extending toward the barrel 91, and the barrel 91 includes four indentations 131a, 131b, 131c, 131d. When the user presses the actuator/button 88 toward the second side 115 of the helmet mount part 86 against the biasing force of the biasing mechanism 134, the barrel cap 120 disengages from the barrel 91 and enables the device mount part 86 to rotate between the deployed position and the stowed position. More specifically, the protrusions 130 disengage the indentations 131 and enable the helmet mount part 86 and the device mount part 87 to rotate with respect to each other around the axis A2. The user rotates these parts 86, 87 until the device mount 10 is in either the deployed position (FIG. 1) and the stowed position (FIG. 2), and then the biasing mechanism 134 causes the the protrusions 130 again engage the indentations 131 to lock the device mount 10 into the respective position. At the same time that the protrusions 130 engage the indentations 131, the biasing mechanism 134 also causes the actuator/button 88 to be released and again protrude outwards from the second side 115 of the helmet mount part 87. In the illustrated embodiment, the device mount 10 is locked into the deployed position when the protrusions 130 engage the indentations 131a and 131b, and the device mount 10 is locked into the stowed position when the protrusions 130 and 130 engage the indentations 131c and 131d.

In the illustrated embodiment, the barrel cap 120 further includes a radially extending protrusion 133 projecting radially outward from the outer circumference thereof. When the device mount part 86 and the pivot mount part 87 are rotated with respect to each other, the radially extending protrusion 133 rotates through the rotational length of the axial extension 135 of the device mount part 86. The radially extending protrusion 133 prevents the barrel cap 120 and the parts fixed thereto from rotating past the axial extension 135 of the device mount part 86 when the barrel cap 120 is not fully disengaged from the barrel 91. The radially extending protrusion 133 also holds the actuator/button 88 and the stem 138 in the actuated position (i.e., pulled into the barrel 91 against the force of the biasing mechanism 134) when the barrel cap 120 is disengaged from the barrel 91 and the axial extension 125 is rotating through the rotational length of the axial extension 135, signaling to the user that the helmet mount assembly 10 is not locked into the deployed position or the stowed position because the actuator/button 88 has not been released so as to protrude outwards from the second side 115 of the helmet mount part 87.

The second pivot adjustment mechanism P2 is configured to further fine-tune the rotational position of the optical device mount 12 with respect to the helmet mount 14 after the helmet mount assembly 10 has been placed in the deployed position by the first pivot adjustment mechanism P1. In the illustrated embodiment, the second pivot adjustment mechanism P2 extends through the first aperture 114 on the first side 113 of the helmet mount part 87. Here, the second pivot adjustment mechanism P2 generally includes one or more of a knob 90, a swivel part 89, and the barrel cap 120. The knob 90 attaches to the helmet mount part 87 via a bolt, screw or pin 110 that passes through an off-center aperture 103 in the knob 90, through an elongate aperture 106 in the swivel part 89, and into a pilot hole 108 on the first side 113 of the helmet mounting part 87. The swivel part 89 further includes an axial protrusion 112 that extends through the first aperture 114 of the helmet mount part 87 and into a corresponding axial aperture in the barrel cap 120, fixing the swivel part 89 to the barrel cap 120 so that the two parts rotate together around the axis A2. The swivel part 89 is thus operatively fixed to the barrel cap 120 and is configured to cause the device mount part 86 to swivel a rotational distance with respect to the helmet mount part 87.

FIG. 22 illustrates the knob 90 in more detail. The knob 90 generally includes a handle 101, a base 102, an offset aperture 103, and a cam part 104. The offset aperture 103 has a center axis A1 that is offset from the center axis A3 of the cam part 104. When assembled, the edge of the offset aperture 103 protrudes into the aperture 108, and the outer surface of the cam part 104 is aligned with the inner surface of the elongated aperture 106 in the swivel part 89. The knob 90 rotates around the off-center axis A1, which causes the outer surface of the cam part 103 to swing around the axis A1 and contact the inner surface of the elongated aperture 106 of the swivel part 89. This motion causes the swivel part 89 to swivel back and forth with respect to the helmet mount part 87 around the rotational axis A2, and thus also causes the device mount part 86 to swivel back and forth with respect to the helmet mount part 87 around the rotational axis A2. The knob 90 rotating around the off-center rotational axis A1 thus causes the device mount part 86 to swivel with respect to the helmet mount part 87 around the rotational axis A2.

Thus, the first pivot adjustment mechanism P1 enables the device mount part 86 to pivot a first rotational distance with respect to the helmet mount part 87 between the stowed position and the deployed position, and the second pivot adjustment mechanism P2 enables the device mount part 86 to pivot/swivel a second rotational distance with respect to the helmet mount part 87 from the deployed position, with the second rotational distance being smaller than the first rotational distance. In other words, the first pivot adjustment mechanism P1 moves the helmet mount assembly 10 from the stowed position to the deployed position, and then the second pivot adjustment mechanism P2 enables the user to fine-tune the relative rotational positioning of the helmet mount 12 from the deployed position. In the illustrated embodiment, the device mount 10 rotates about 130 degrees with respect to the helmet mount part 14 when rotating between the retracted and deployed positions, and then swivels about 17 degrees with respect to the helmet mount part 14 when being swiveled from the deployed position.

The pivot adjustment mechanisms P1, P2 can also be viewed as three pivot subassemblies, namely, (i) a first pivot subassembly located on the second side 115 of the helmet mounting part 87 and including one or more of the actuator 88, the dial casing 99, the biasing mechanism 134, the o-ring 136 and the stem 138, (ii) a second pivot subassembly located on the first side 113 of the helmet mounting part 87 and including one or more of the swivel part 89, the knob 90, and the bolt, screw pin 110, and (iii) a third pivot subassembly located between the first side 113 and the second side 115 of the mounting part 87 and including one or more of the device mount part 86, the barrel cap 120 and the washer 128. The first pivot subassembly and the third pivot subassembly operatively attach to each other through the second aperture 116. The second pivot subassembly and the third pivot subassembly operatively attach to each other through the first aperture 114. The first pivot subassembly and the third pivot subassembly cooperate to enable the device mount part 86 to pivot the first rotational distance with respect to the helmet mount part 87 between the deployed position and the stowed position, while the second pivot subassembly and the third pivot subassembly cooperate to enable the device mount part 86 to pivot/swivel the smaller second rotational distance with respect to the helmet mount part 87 from the deployed position.

The disclosed helmet mount is made of a lightweight, yet sturdy aluminum alloy, ensuring that it can withstand the rigors of intense combat situations. In an embodiment, the helmet mount assembly 10 is made of aluminum (e.g., 6061-T6) and has approximate dimensions of 8.35 cm (length)×6.35 cm (width)×5 cm (height). The device mount 12 linearly translates up to 45 mm along the device mount part 86, and the helmet mount 14 linearly translates up to 27 mm along the helmet mount part 86.

It should be understood that various changes and modifications to the systems and methods described herein will be apparent to those skilled in the art and can be made without diminishing the intended advantages.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the helmet mount. Accordingly, these terms, as utilized to describe the present invention should be interpreted relative to a vehicle equipped with the helmet mount.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A helmet mount assembly configured to moveably attach a plurality of optical devices to a plurality of helmets, the helmet mount assembly comprising:
a device mount configured to removably attach to the plurality of optical devices;
a helmet mount configured to removably attach to the plurality of helmets; and
a pivot structure including a device mount part, a helmet mount part, a first pivot adjustment mechanism and a second pivot adjustment mechanism,
the device mount moveably connected to the device mount part so as to linearly translate with respect to the device mount part,
the helmet mount moveably connected to the helmet mount part so as to linearly translate with respect to the helmet mount part,
the first pivot adjustment mechanism enabling the device mount part to pivot a first rotational distance with respect to the helmet mount part between a deployed position and a stowed position, and
the second pivot adjustment mechanism enabling the device mount part to pivot a second rotational distance with respect to the helmet mount part from the deployed position, the second rotational distance smaller than the first rotational distance,
the device mount including a housing and a release lever,
the release lever is pivotally connected to the housing at a pivot point and includes a locking tooth;
the release lever is actuated to cause the locking tooth to move from a locked position in which the locking tooth engages an optical device to a retracted position in which the locking tooth releases the optical device, and
the pivot point of the release lever is adjustable with respect to the housing to alter a relative position of the locking tooth.

2. The helmet mount assembly of claim 1, wherein
the housing includes opposite ends each having a respective inner column, with a plurality of magnets within the inner columns.

3. The helmet mount assembly of claim 1, wherein
the first pivot adjustment mechanism enables the device mount part to pivot with respect to the helmet mount part around a rotational axis, and
the second pivot adjustment mechanism enables the device mount part to pivot with respect to the helmet mount part around the rotational axis.

4. The helmet mount assembly of claim 3, wherein
the first pivot adjustment mechanism includes an actuator, a biasing mechanism and a barrel cap,
the biasing mechanism biases the actuator away from the device mount part and the helmet mount part, and
the actuator is configured to be pressed against the biasing force of the biasing mechanism to cause the barrel cap to disengage a corresponding barrel and enable the device mount part to rotate between the deployed position and the stowed position.

5. A helmet mount assembly configured to moveably attach a plurality of optical devices to a plurality of helmets, the helmet mount assembly comprising:
a device mount configured to removably attach to the plurality of optical devices;
a helmet mount configured to removably attach to the plurality of helmets; and
a pivot structure including a device mount part, a helmet mount part, a first pivot adjustment mechanism and a second pivot adjustment mechanism,
the device mount moveably connected to the device mount part so as to linearly translate with respect to the device mount part,
the helmet mount moveably connected to the helmet mount part so as to linearly translate with respect to the helmet mount part,
the first pivot adjustment mechanism enabling the device mount part to pivot a first rotational distance with respect to the helmet mount part between a deployed position and a stowed position,
the second pivot adjustment mechanism enabling the device mount part to pivot a second rotational distance with respect to the helmet mount part from the deployed position, the second rotational distance smaller than the first rotational distance,
the first pivot adjustment mechanism including an actuator, a biasing mechanism and a barrel cap,
the biasing mechanism biases the actuator away from the device mount part and the helmet mount part,
the actuator is configured to be pressed against the biasing force of the biasing mechanism to cause the barrel cap to disengage a corresponding barrel and enable the device mount part to rotate between the deployed position and the stowed position, and
the pivot structure including a swivel part operatively fixed to the barrel cap, the swivel part configured to cause the device mount part to swivel the second rotational distance with respect to the helmet mount part.

6. The helmet mount assembly of claim 1, wherein
the pivot structure includes a knob configure to rotate around an off-center rotational axis to cause the device mount part to swivel the second rotational distance with respect to the helmet mount part.

7. A helmet mount assembly configured to moveably attach a plurality of optical devices to a plurality of helmets, the helmet mount assembly comprising:
a device mount configured to removably attach to the plurality of optical devices;
a helmet mount configured to removably attach to the plurality of helmets; and
a pivot structure including a device mount part, a helmet mount part, a first pivot adjustment mechanism and a second pivot adjustment mechanism;
the device mount moveably connected to the device mount part so as to linearly translate with respect to the device mount part,
the helmet mount moveably connected to the helmet mount part so as to linearly translate with respect to the helmet mount part,
the first pivot adjustment mechanism enabling the device mount part to pivot a first rotational distance with respect to the helmet mount part between a deployed position and a stowed position,
the second pivot adjustment mechanism enabling the device mount part to pivot a second rotational distance with respect to the helmet mount part from the deployed position, the second rotational distance smaller than the first rotational distance,
the pivot structure including a knob configure to rotate around an off-center rotational axis to cause the device mount part to swivel the second rotational distance with respect to the helmet mount part,
the knob including an outer contact surface, the pivot structure including a swivel part having an elongated aperture therethrough, and the outer contact surface contacts an inner surface of the elongated aperture to contact the swivel part to swivel when the knob rotates around the off-center rotational axis.

8. A helmet mount assembly configured to moveably attach a plurality of optical devices to a plurality of helmets, the helmet mount assembly comprising:

a device mount configured to removably attach to the plurality of optical devices;

a helmet mount configured to removably attach to the plurality of helmets; and a pivot structure including a device mount part, a helmet mount part, a first pivot subassembly, a second pivot subassembly and a third pivot subassembly, the device mount moveably connected to the device mount part so as to linearly translate with respect to the device mount part, the helmet mount moveably connected to the helmet mount part so as to linearly translate with respect to the helmet mount part, the first pivot subassembly and the third pivot subassembly operably attached and cooperating to enable the device mount part to pivot a first rotational distance with respect to the helmet mount part between a deployed position and a stowed position, and the second pivot subassembly and the third pivot subassembly operably attached and cooperating to enable the device mount part to pivot a second rotational distance with respect to the helmet mount part from the deployed position, the second rotational distance smaller than the first rotational distance, the device mount including a housing and a release lever, the release lever is pivotally connected to the housing at a pivot point and includes a locking tooth, the release lever is actuated to cause the locking tooth to move from a locked position in which the locking tooth engages an optical device to a retracted position in which the locking tooth releases the optical device, and the pivot point of the release lever is adjustable with respect to the housing to alter a relative position of the locking tooth when in the locked configuration.

9. The helmet mount assembly of claim 8, wherein the device mount translates linearly along a first linear axis of the device mount part, and the helmet mount translates linearly along a second linear axis of the helmet mount part, the second linear axis different from the first linear axis.

10. A helmet mount assembly P1 wherein configured to moveably attach a plurality of optical devices to a plurality of helmets, the helmet mount assembly comprising:

a device mount configured to removably attach to the plurality of optical devices;

a helmet mount configured to removably attach to the plurality of helmets; and a pivot structure including a device mount part, a helmet mount part, a first pivot subassembly, a second pivot subassembly and a third pivot subassembly, the device mount moveably connected to the device mount part so as to linearly translate with respect to the device mount part, the helmet mount moveably connected to the helmet mount part so as to linearly translate with respect to the helmet mount part, the first pivot subassembly and the third pivot subassembly operably attached and cooperating to enable the device mount part to pivot a first rotational distance with respect to the helmet mount part between a deployed position and a stowed position, and the second pivot subassembly and the third pivot subassembly operably attached and cooperating to enable the device mount part to pivot a second rotational distance with respect to the helmet mount part from the deployed position, the second rotational distance smaller than the first rotational distance, the first pivot subassembly including an actuator, the third pivot subassembly including a barrel cap, and the actuator is configured to be pressed towards the barrel cap to cause the barrel cap to disengage a corresponding barrel and enable the helmet mount part to rotate between the deployed position and the stowed position.

11. The helmet mount assembly of claim 10, wherein the pivot structure includes a swivel part operatively fixed to the barrel cap, the swivel part configured to cause the device mount part to swivel the second rotational distance with respect to the helmet mount part.

12. A helmet mount assembly configured to moveably attach a plurality of optical devices to a plurality of helmets, the helmet mount assembly comprising:

a device mount configured to removably attach to the plurality of optical devices;

a helmet mount configured to removably attach to the plurality of helmets; and a pivot structure including a device mount part, a helmet mount part, a first pivot subassembly, a second pivot subassembly and a third pivot subassembly, the device mount moveably connected to the device mount part so as to linearly translate with respect to the device mount part, the helmet mount moveably connected to the helmet mount part so as to linearly translate with respect to the helmet mount part, the first pivot subassembly and the third pivot subassembly operably attached and cooperating to enable the device mount part to pivot a first rotational distance with respect to the helmet mount part between a deployed position and a stowed position, and the second pivot subassembly and the third pivot subassembly operably attached and cooperating to enable the device mount part to pivot a second rotational distance with respect to the helmet mount part from the deployed position, the second rotational distance smaller than the first rotational distance, the pivot structure including a knob configure to rotate around an off-center rotational axis to cause the device mount part to swivel the second rotational distance with respect to the helmet mount part.

13. A helmet mount assembly configured to moveably attach a plurality of optical devices to a plurality of helmets, the helmet mount assembly comprising:

a device mount configured to removably attach to the plurality of optical devices;

a helmet mount configured to removably attach to the plurality of helmets; and a pivot structure pivotally connecting the device mount to the helmet mount, the device mount including a housing and a release lever, the release lever pivotally connected to the housing at a pivot point and having a locking tooth, the release lever actuated to cause the locking tooth to move from a locked position in which the locking tooth engages an optical device to a retracted position in which the locking tooth releases the optical device, and the pivot point of the release lever being adjustable with respect to the housing to alter a relative positioning of the locking tooth.

14. The helmet mount assembly of claim 13, wherein the housing includes opposite ends each having a respective inner column, with a plurality of magnets within the inner columns.

15. The helmet mount assembly of claim 13, wherein the device mount includes a plurality of positioning screws enabling a user to adjust the pivot point with respect to the housing.

16. The helmet mount assembly of claim 13, wherein the device mount includes a pair of actuating arms biased outwardly by a biasing force of a biasing mechanism, and the pair of actuating arms enable linear adjustment of the device mount with respect to the pivot structure when the actuating arms are squeezed towards each other against the biasing force.

17. The helmet mount assembly of claim 13, wherein the release lever includes an actuator, the actuator protrudes from a first side of the housing, the locking tooth protrudes from an opposite second side of the housing, and actuating the actuator causes the locking tooth to move to the retracted position in which the locking tooth releases the optical device.

18. The helmet mount assembly of claim 13, wherein the pivot structure includes a first pivot adjustment mechanism and a second pivot adjustment mechanism, the first pivot adjustment mechanism enables the device mount to pivot a first rotational distance with respect to the helmet mount between a deployed position and a stowed position, and the second pivot adjustment mechanism enables the device mount to pivot a second rotational distance with respect to the helmet mount from the deployed position, the second rotational distance smaller than the first rotational distance.

19. The helmet mount assembly of claim 5, wherein the device mount includes a housing and a release lever, the release lever is pivotally connected to the housing at a pivot point and includes a locking tooth, the release lever is actuated to cause the locking tooth to move from a locked position in which the locking tooth engages an optical device to a retracted position in which the locking tooth releases the optical device, and the pivot point of the release lever is adjustable with respect to the housing to alter a relative position of the locking tooth.

20. The helmet mount assembly of claim 12, wherein the device mount includes a housing and a release lever, the release lever is pivotally connected to the housing at a pivot point and includes a locking tooth, the release lever is actuated to cause the locking tooth to move from a locked position in which the locking tooth engages an optical device to a retracted position in which the locking tooth releases the optical device, and the pivot point of the release lever is adjustable with respect to the housing to alter a relative position of the locking tooth when in the locked configuration.

* * * * *